(12) United States Patent  (10) Patent No.:  US 6,880,082 B2
Ohta  (45) Date of Patent:  Apr. 12, 2005

(54) BROADCAST VERIFICATION SYSTEM, BROADCAST VERIFICATION METHOD, BROADCAST VERIFICATION APPARATUS AND STORAGE MEDIUM STORING BROADCAST VERIFICATION PROGRAM

(75) Inventor: Mutsumi Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 884 days.

(21) Appl. No.: 09/855,248

(22) Filed: May 15, 2001

(65) Prior Publication Data

US 2002/0044659 A1 Apr. 18, 2002

(30) Foreign Application Priority Data

May 15, 2000 (JP) ...................................... 2000-142359

(51) Int. Cl.[7] .............................................. G06F 1/24
(52) U.S. Cl. ........................ 713/168; 713/200; 713/201
(58) Field of Search ............................... 713/168, 200, 713/201

(56) References Cited

U.S. PATENT DOCUMENTS 5,594,872 A * 1/1997 Kawano et al. ............. 709/240
6,700,989 B1 * 3/2004 Itoh et al. ................... 382/100

FOREIGN PATENT DOCUMENTS

| JP | 56-8938 | 1/1981 |
|---|---|---|
| JP | 7-79206 | 3/1995 |
| JP | 2000-259832 | 9/2000 |

* cited by examiner

Primary Examiner—Thomas R. Peeso
(74) Attorney, Agent, or Firm—Scully, Scott, Murphy & Presser

(57) ABSTRACT

A broadcast verification system is provided which enables broadcast verification to be performed by a third party being independent of a broadcasting station, without being assisted by another, at low costs and to be reported to a client.

The client submits CM (Commercial Message) images to the broadcasting station and registers feature descriptors in a database. When the broadcasting station broadcasts the CM images in accordance with a contract, a receiving device in a checking base extracts contents from received broadcasting waves and a checking section compares feature descriptors of the contents with that of contents stored in the database. When there is coincidence between them, the checking section transmits comparison results to an aggregating section which creates a report including broadcast time, broadcasting channel, broadcasting state and submits it to the client. A broadcast verifying agent receives a broadcast verification entrusting fee.

34 Claims, 11 Drawing Sheets

BROADCAST VERIFICATION SYSTEM, BROADCAST VERIFICATION METHOD, BROADCAST VERIFICATION APPARATUS AND STORAGE MEDIUM STORING BROADCAST VERIFICATION PROGRAM

BACKGROUND OF THE INVENTION

1. Field of the Invention

The present invention relates to a broadcast verification system for a wired or wireless broadcast transmission for radio, television or a like.

The present application claims priority of Japanese Patent Application No. 2000-142359 filed on May 15, 2000, which is hereby incorporated by reference.

2. Description of the Related Art

A Commercial Message(hereinafter referred to as a CM) is broadcast in a manner that a broadcasting station signs a contract with a client including an advertiser or an advertisement agency and broadcasts voice data and/or video data provided by the client. Though CM broadcasting time is roughly predetermined, since a schedule of a program is sometimes changed due to an occurrence of emergency news, due to convenience of the program itself, or a like, time for broadcasting the CM is not exactly determined.

It is important for the clients to know whether a desired number of the CMs has been broadcast at an intended time. According to a conventional broadcast verification system, the broadcasting station assures, by submitting a broadcasting confirmation report to the client at every end of a month, that the CM has been broadcast as agreed between the broadcasting station and the client.

However, contents of the broadcasting confirmation report, because it is reported by the broadcasting station itself, does not undergo a verification by a third party. Such the system of submitting the broadcasting confirmation report has been long supported by business practices. Because of this, even if a fraud is committed, it cannot be checked easily; for example, there is a case where, even if the CM was not broadcast as agreed in the contract, the broadcasting confirmation report is submitted reporting that the broadcasting as agreed in the contract has been carried out as agreed.

As a method for checking whether CMs have been broadcast as agreed, a client's visual check on the broadcasting of CMs is conventionally and generally employed. However, human verification has problems in that it costs much and, when the number of channels or CMs to be checked increases, the number of humans making such verification has to be increased accordingly. Another problem with the visual check is that checking accuracy fluctuates depending on a health condition of the human making the check. Moreover, it is necessary for an advertiser to make an investigation on results of broadcasting of CMs not only for his/her own company but also for rival companies or different industries from a viewpoint of marketing implementation, however, the method using the above human verification costs much as well.

The above description is also true for distribution of videos or images other than CMs. For example, distribution of a news video having a logo of a source broadcasting station at an other foreign broadcasting station is widely carried out today. However, as in the case of the CM, a system in which the source broadcasting station can grasp time, place, and number of times of broadcasting the video is not available. The source broadcasting station cannot choose but to believe reports submitted from the other broadcasting station as to which news video has been distributed or but rely on the human verification as in the case of the CM.

To solve this problem, a broadcast verification system is disclosed in, for example, Japanese Patent Application Laid-open No. Hei 7-79206 which is used to verify whether a CM is broadcast or not. In the disclosed technology, an automatic identification of broadcasting of a CM is performed by judging whether the broadcasting of the CM is started or ended depending on whether voices from, for example, a television (TV) becomes soundless while the TV is ON and on whether images being broadcast are greatly changed, by taking out these voice signals while these phenomena occur and by comparing these voice signals with those stored in advance.

However, if the check on the CM broadcasting is made only by the voice checking method, following problems occur. That is, CMs for some health drinks and soft drinks have their various versions and, even if the CMs have the same voices, in some cases, they have different images. In this case, since differences in versions cannot be found out by the above broadcast verification method using voice recognition, even if an old version CM is broadcast after the version of the CM is renewed, it is impossible to distinguish the old CM from the new one.

Furthermore, a system to verify whether a CM has been broadcast as agreed with a sponsor is disclosed in Japanese Patent Application Laid-open Sho 56-8938 in which checking is made as to whether the broadcasting of CMs is detected in a time band, in the number of times and on date, as agreed, by detecting an identification number that has been incorporated in the CM broadcasting. However, since such the identification is predetermined uniquely by each of the broadcasting stations, it is impossible to verify whether a CM that has been broadcast by other broadcasting stations has been broadcast or not.

SUMMARY OF THE INVENTION

In view of the above, it is an object of the present invention to provide a broadcast verification system which enables a third party being independent of a broadcasting station or a client to perform broadcast verification as to whether CMs or contents of a news video to be reported to the client have been actually broadcast, as agreed between the client and the broadcasting station. It is another object of the present invention to provide a storage medium storing programs to have a computer to implement a broadcast verification apparatus and broadcast verification method employed in the broadcast verification system.

According to a first aspect of the present invention, there is provided a broadcast verification system made up of a broadcasting station, a client entrusting the broadcasting station to broadcast contents including images, and a broadcast verification apparatus to verify whether the contents have been broadcast as agreed to by a contract between the broadcasting station and the client, the broadcast verification apparatus including:

a feature descriptor calculating section to calculate feature descriptors of the content-s that the client entrusted the broadcasting station to broadcast;

a storing section to store the feature descriptors of the contents;

a comparing section to calculate the feature descriptors of contents detected from broadcasting waves broadcast by the broadcasting station and to compare the feature descriptors obtained by the calculation with the feature descriptors stored in the storing section;

a reporting section to report a comparison result obtained by the comparison to the client; and wherein the client checks, by acquiring the comparison result, whether the contents entrusted by the client to be broadcast have been broadcast.

With the above configuration, the feature descriptor is calculated from the contents that are entrusted to be broadcast by an advertiser, advertisement agent, or news video distributor being the client and the calculated descriptor is compared with that of the contents detected from the broadcasting waves broadcast by the broadcasting station and the comparison result is reported to the client. Therefore, the client can check, by acquiring the comparison result, whether the contents entrusted by the client to be broadcast have been broadcast.

According to a second aspect of the present invention, there is provided a broadcast verification system made up of a broadcasting stat-on, a client entrusting the broadcasting station to broadcast contents including images, and a broadcast verification apparatus to verify whether the contents have been broadcast as agreed to by a contract between the broadcasting station and the client, the broadcast verification apparatus including:

an identification number storing section to store an identification number assigned to the contents that the client entrusts the broadcasting station to broadcast, a comparing section to take out the identification number implanted, by using digital watermarking technology making a digital watermark, in contents detected from broadcasting waves broadcast by the broadcasting station and to compare the identification number with the stored identification number;

a reporting section to report a comparison result obtained by the comparison to the client; and wherein the client has a watermark implanting section to implant the identification number assigned to the contents that the client wants to broadcast by using the watermarking implanting technology and entrusts the broadcasting station to broadcast the contents and checks, by acquiring the comparison result, whether the contents entrusted by the client to be broadcast have been broadcast.

With the above configuration, the identification number assigned to the contents that the client has entrusted the broadcasting station to broadcast is compared with that implanted by digital watermarking technology in the contents detected from received broadcasting waves and the comparison result is reported to the client. On the other hand, the client implants, using digital watermarking technology, the identification number assigned to the contents that the client wants to broadcast and entrusts the broadcasting station to broadcast the contents. Therefore, the client, by acquiring the comparison result, can verify whether the contents that the client entrusted the broadcasting station to broadcast have been broadcast. Moreover, since the client performs implanting of the watermark, the broadcast verification system is excellent in immediacy of operations and is suitable to a case of broadcast verification on news video in particular.

According to a third aspect of the present invention, there is provided a broadcast verification system made up of a broadcasting station, a client entrusting the broadcasting station to broadcast contents including images, and a broadcast verification apparatus to verify whether the contents have been broadcast as agreed to by a contract between the broadcasting station and the client, the broadcast verification apparatus including:

an implanting section to assign an identification number to each of the contents transmitted from the client and to implant the identification number in each of the contents by using digital watermarking technology making a digital watermark and to return it to the client;

a storing section to store the identification number that has been implanted in the contents returned back to the client;

a comparing section to take out the identification number implanted, using digital watermarking technology, in the contents detected from broadcasting waves broadcast by the broadcasting station and to compare it with the stored identification;

a reporting section to report a comparison result obtained through the comparison to the client; and wherein the client entrusts the broadcasting station to broadcast the returned contents and, by acquiring the comparison result, checks whether the contents entrusted by the client to be broadcast have been broadcast.

With the above configuration, the identification number is assigned to each of the contents transmitted from the client and the identification number is implanted in the contents using digital watermarking technology and is returned back to the client. At the same time, the identification number which has been implanted in the contents returned back to the client is stored. The identification number implanted, using digital watermarking technology, in contents detected from received broadcasting waves is taken out and is compared with the stored identification number. Therefore, the client, by acquiring the comparison result, can verify whether contents that the client has entrusted the broadcasting station to broadcast have been broadcast.

According to a fourth aspect of the present invention, there is provided a broadcast verification system made up of a broadcasting station, a client entrusting the broadcasting station to broadcast contents including images, and a broadcast verification apparatus to verify whether the contents have been broadcast as agreed to by a contract between the broadcasting station and the client, the broadcast verification apparatus including:

a storing section to store all or a part of the contents that the client entrusted the broadcasting station to broadcast;

a comparing section to compare the contents detected from broadcasting waves broadcast by the broadcasting station with all or a part of the stored contents;

a reporting section to report a comparison result obtained through the comparison to the client; and wherein the client, by acquiring the comparison result, checks whether the contents entrusted by the client to be broadcast have been broadcast.

With the above configuration, all or a part of the contents that the client has entrusted the broadcasting station to broadcast are compared with all or a part of the contents detected from broadcasting waves broadcast by the broadcasting station and the comparison result is reported to the client. Therefore, the client, by acquiring the comparison result, can verify whether the contents that the client entrusted the broadcasting station to broadcast have been broadcast.

According to a fifth aspect of the present invention, there is provided a broadcast verification apparatus for checking, for a client which entrusts a broadcasting station to broadcast contents containing images, whether the contents have been broadcast as agreed to by a contract between the broadcasting station and the client, including:

a storing section to store feature descriptors of the contents;

a registering section to calculate the feature descriptors of the contents transmitted from the client and to register them in the storing section;

a detecting section to receive broadcasting waves broadcast by the broadcasting station and to detect the contents;

a feature descriptor calculating section to calculate feature descriptors of the detected contents;

a comparing section to compare the calculated feature descriptors with those stored in the storing section; and a reporting section to report the comparison result obtained through the comparison to the client.

With the above configuration, when the client requests the broadcast verification apparatus of a broadcast verifying agent to register contents that have to undergo the broadcast verification, the broadcast verification apparatus calculates the feature descriptors of the received contents and stores the calculated feature descriptors. The broadcast verification apparatus detects the contents from the received broadcasting waves, calculates the feature descriptors of the contents, compares them with the stored feature descriptors and then reports the comparison results to the client. This allows a third party to check broadcasting waves, enabling a low-cost checking as to whether there is "thinning-out" broadcasting of CMs or there is broadcasting of distributing news videos beyond the contract. Moreover, this allows the database used to store the feature descriptors to be made small-scaled and time required for the broadcast verification to be reduced more when compared with the case where the contents themselves are compared.

In the foregoing, a preferable mode is one wherein the feature descriptor calculating section generates the feature descriptor by dividing image data of the contents into a plurality of blocks, creating a reduced image using each of the blocks and performing frequency conversion and quantizing processing on the reduced image.

Also, a preferable mode is one wherein the feature descriptor calculating section calculates the feature descriptors in all frames to be received.

With the above configuration, the feature descriptors are calculated in all frames to be received. This enables frame dropping in the CM broadcasting to be detected and this state to be reported to the client.

Also, a preferable mode is one wherein the feature descriptor calculating section calculates the feature descriptors only in a part of the frames to be received.

With the above configuration, the feature descriptors only in the part of frames to be received are calculated. This allows time required for the calculation of the feature descriptors to be reduced, thus enabling the broadcast verification by using a computer even having comparatively a low processing capacity or a like.

According to a sixth aspect of the present invention, there is provided a broadcast verification apparatus for checking, for a client which entrusts a broadcasting station to broadcast contents containing images, whether the contents have been broadcast as agreed to by a contract between the broadcasting station and the client, including:

a storing section to store an identification number assigned to each of the contents;

a registering section to assign the identification number to the contents on which the client wants to perform the broadcast verification and to issue the identification number to the client and to register it on the storing section;

a detecting section to receive broadcasting waves obtained when the contents with the issued identification number implanted by the client using digital watermarking technology making a digital watermark are broadcast by the broadcasting station and to detect the identification number implanted by the digital watermarking technology, from the broadcasting waves;

a comparing section to compare the detected identification number with the identification number stored in the storing section; and a reporting section to report the comparison result obtained through the comparison to the client.

With the above configuration, the identification number is assigned to each of the contents on which the client wants to perform the broadcast verification and is issued to the client and the identification is stored in the storing section. The client, after having implanted the identification number issued when the client entrusted the broadcasting station to broadcast the contents in the contents, by using digital watermarking technology, transfers the contents to the broadcasting station, which then broadcasts them. The broadcast verification apparatus detects the identification number implanted, using digital watermarking technology, in the contents detected from the broadcasting waves and compares the detected identification number with that stored in the storing section. The comparison result is reported to the client. This allows a third party to check broadcasting waves, enabling low-cost checking as to whether there is "thinning-out" broadcasting of CMs or as to whether there is broadcasting of distributing news videos beyond the contract. Moreover, since the watermark is used, a possibility that the identification number is tampered with can be reduced more than a case where the contents transferred directly from the client are broadcast as they are, thus improving confidence in the broadcast verification.

According to a seventh aspect of the present invention, there is provided a broadcast verification apparatus for checking, for a client which entrusts a broadcasting station to broadcast contents containing images, whether the contents have been broadcast as agreed to by a contract between the broadcasting station and the client, including:

a storing section to store an identification number assigned to each of the contents;

a registering section to assign the identification number to the contents on which the client wants to perform broadcast verification and to register the identification number to the storing section;

an implanting section to implant the identification number in the contents on which broadcast verification is to be performed by using digital watermarking technology making a digital watermark and to transmit them to the client;

a detecting section to receive broadcasting waves obtained when the contents with the identification implanted are broadcast by the broadcasting station and to detect the identification number implanted in the contents, using digital watermarking technology, from the broadcasting waves;

a comparing section to compare the detected identification number with that stored in the storing section; and a reporting section to report the comparison result obtained through the comparison to the client.

With the above configuration, the implantation of the identification number in the contents on which the client wants to perform the broadcast verification, by using the digital watermarking technology, is carried out by the broadcast verification apparatus not by the client. The broadcast verification apparatus assigns the identification number to each of the contents on which the client wants to perform the broadcast verification and registers it on the storing section and implants the identification number in the contents by using watermark technology and returns them to the client. This allows a third party to check broadcasting waves, enabling low-cost checking as to whether there is "thinning-out" broadcasting of CMs or there is broadcasting of distributing news videos beyond the contract. Moreover, since the watermark is used, a possibility that the identification number is tampered with can be reduced more than when compared with a case where the contents transferred directly from the client are broadcast as they are, thus improving confidence in the broadcast verification. Since there is no need for the client to implant the identification number, a load is taken off the client.

According to an eighth aspect of the present invention, there is provided a broadcast verification apparatus for checking, for a client which entrusts a broadcasting station to broadcast contents containing images, whether the contents have been broadcast as agreed to by a contract between the broadcasting station and the client, including:

a storing section to store the contents;

a registering section to register all or a part of the contents on which the client wants to perform the broadcast verification;

a detecting section to receive broadcasting waves broadcast by the broadcasting station and to detect contents contained in the broadcasting waves;

a comparing section to compare the detected contents with all or a part of the contents stored in the storing section; and a reporting sect-on to report the comparison result obtained through the comparison to the client.

With the above configuration, by registering all or a part of the contents on which the client wants to perform the broadcast verification in the broadcast verification apparatus, all or a part of the contents is stored within the broadcast verification apparatus. The broadcast verification apparatus compares contents detected from the received broadcasting waves with all or a part of the stored contents and reports comparison results to the client. This allows a third party to check broadcasting waves, enabling low-cost checking as to whether there is "thinning-out" broadcasting of CMs or there is broadcasting of distributing news videos beyond the contract.

In the foregoing, a preferable mode is one that wherein includes:

a time information generating section to generate time information obtained when the comparing section detects the contents on which the client wants to perform the broadcast verification from the broadcasting waves;

a time information adding section to add the time information to the detected contents; and a storing section to store the contents with the time information added.

With the above configuration, the time information obtained when the contents on which the client wants to perform the broadcast verification are detected is added to the detected contents and the contents with the time information added and the time information are stored. When the contents with the time information added to are submitted, one evidence certifying that the broadcast verifying agent has surely performed the broadcast verification is produced, thus improving evidence capability in reports to the client.

Also, a preferable mode is one wherein the contents are made up of not only the images but also voices, the detecting section detects voice data making up the contents contained in the broadcasting waves, the storing section stores voice data making up the contents that the client entrusts the broadcasting station to broadcast and the comparing section compares the detected data with the stored voice data and outputs comparison results.

With the above configuration, in the contents are contained voices in addition to images. Voice data making up contents on which the client wants to perform the broadcast verification is stored and voice data is detected from contents contained in the broadcasting waves and is compared with the stored voice data. Thus, by using voice checking in combination, the detection accuracy of the contents can be improved more than a case in which only the image checking is used in the broadcast verification. When the voice checking result is compared with the image checking result, if both the results coincide with each other, it provides positive proof that the contents obtained by the image checking are the contents on which broadcast verification has to be performed. If both the results do not coincide with each other, there is room for doubt that the contents obtained by image checking are ones erroneously detected.

Also, a preferable mode is one wherein the reporting section obtains the comparison results after having continued aggregation for a specified period of time and transmits the results to the client.

According to a ninth aspect of the present invention, there is provided a broadcast verification method for checking, for a client which entrusts a broadcasting station to broadcast contents containing images, whether the contents have been broadcast as agreed to by a contract between the broadcasting station and the client, including:

a step of receiving the contents from the client;

a step of calculating the feature descriptors of received contents;

a step of storing the calculated feature descriptors;

a step of receiving broadcasting waves transmitted from the broadcasting station and detecting the contents;

a step of calculating the feature descriptors of the detected contents;

a step of comparing the calculated feature descriptors with the stored feature descriptors; and a step of transmitting a result obtained by the comparison to the client.

According to a tenth aspect of the present invention, there is provided a broadcast verification method for checking, for a client which entrusts a broadcasting station to broadcast contents containing images, whether the contents have been broadcast as agreed to by a contract between the broadcasting station and the client, including:

a step of assigning an identification number to each of the contents on which the client wants to perform the broadcast verification;

a step of issuing the identification number to clients and storing identification numbers;

a step of receiving broadcasting waves obtained when broadcasting stations broadcast contents in which the identification number has been implanted by the client by using digital watermarking technology making a digital watermark and of detecting the contents from the broadcasting waves;

a step of judging whether the watermark exists in the detected contents;

a step of detecting, if the watermark exists, the identification number implanted, using digital watermarking technology, in the detected contents;

a step of comparing the detected identification number with the stored identification number; and a step of transmitting a result obtained through the comparison to the client.

According to an eleventh aspect of the present invention, there is a broadcast verification method for checking, for a client which entrusts a broadcasting station to broadcast contents containing images, whether the contents have been broadcast as agreed to by a contract between the broadcasting station and the client, including:

a step of receiving contents on which the client wants to perform the broadcast verification;

a step of assigning an identification number to each of the received contents and storing the identification number;

a step of implanting the identification number in contents on which the broadcast verification has to be performed, using digital watermarking technology making a digital watermark;

a step of returning contents with the identification number implanted to the client;

a step of receiving broadcasting waves obtained when the broadcasting station broadcasts the contents with the identification number implanted and detecting the contents from the broadcasting station;

a step of judging whether the watermark exists in the detected contents;

a step of detecting, if the watermark exists, the identification number implanted, using digital watermarking technology, in the detected contents;

a step of comparing the detected identification number with the stored identification number; and a step of transmitting a result obtained through the comparison to the client.

According to a twelfth aspect of the present invention, there is provided a broadcast verification method for checking, for a client which entrusts a broadcasting station to broadcast contents containing images, whether the contents have been broadcast as agreed to by a contract between the broadcasting station and the client, including:

a step of receiving the contents from the client;

a step of storing all or a part of the received contents;

a step of receiving broadcasting waves broadcast by the broadcasting station and detecting the contents;

a step of comparing the detected contents with all or a part of the stored contents; and a step of transmitting a result obtained through the comparison to the client.

According to a thirteenth aspect of the present invention, there is provided a computer-readable storage medium storing broadcast verification programs to execute broadcast verification methods stated above.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
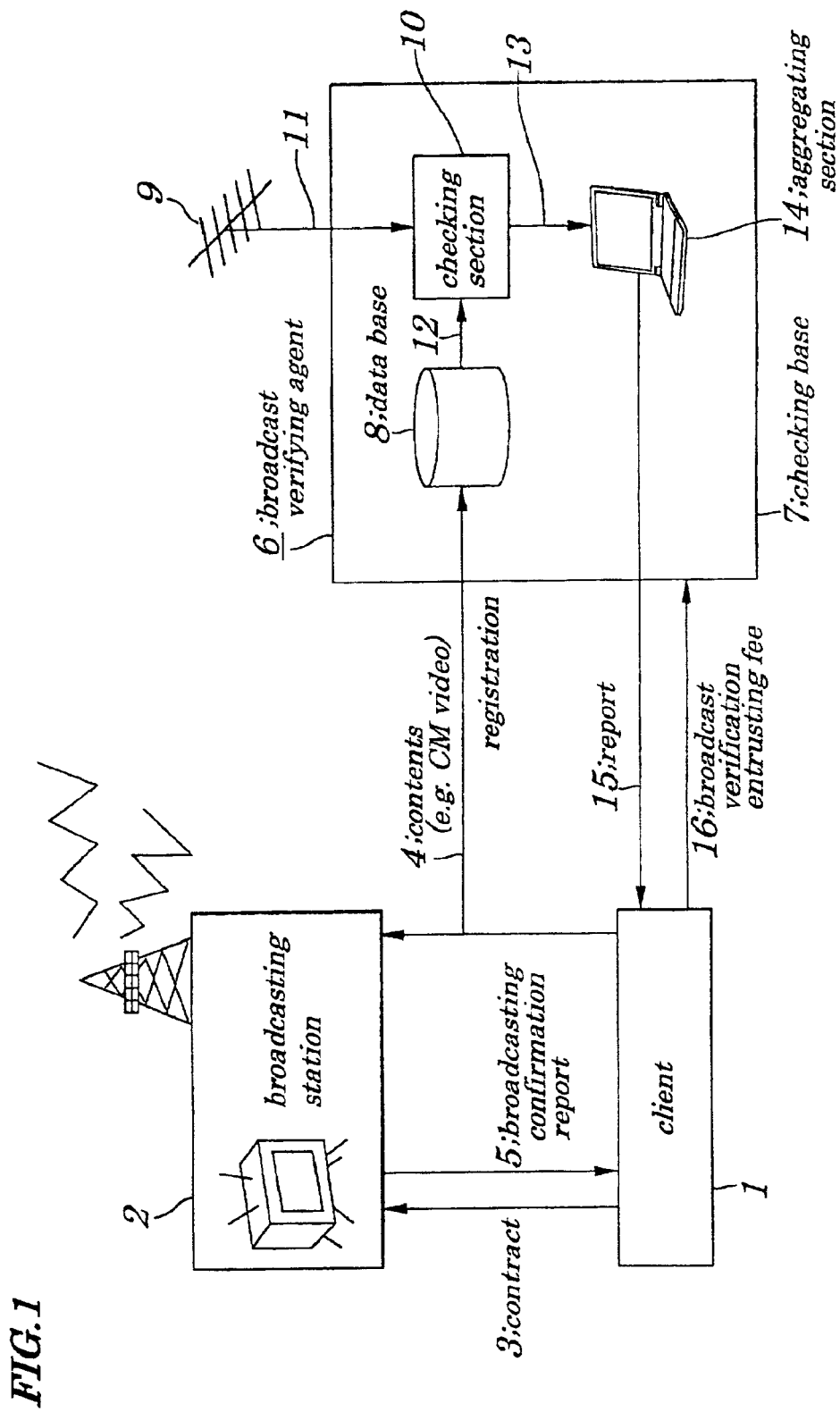
FIG. 1 is a schematic block diagram showing configurations of a broadcast verification system according to a first embodiment of the present invention.

FIG. 1 is a schematic block diagram showing configurations of a broadcast verification system according to a first embodiment of the present invention. In FIG. 1, a client 1 is an advertiser or an advertisement agent and the client 1 signs a contract 3 for commercial broadcasting with a broadcasting station 2. Here, the client 1 may be the broadcasting station 2 who distributes news videos, in which the broadcasting station 2 serves as an other broadcasting station to which the client 1 is distributing the news videos. The CM may be broadcast on TV or on radio and in a manner of wired or in wireless broadcasting. As described above, since prior art voice checking provides insufficient results, the broadcast verification system is preferably applied to checking in television broadcasting.

The client 1 submits, in accordance with the contract 3, contents 4 (a CM video in this example) including images and/or voices that are desired to be broadcast to the broadcasting station 2 and the broadcasting station 2 broadcasts the contents 4. Moreover, the contents 4 are not limited to images and/or voices for the CM broadcasting and images other than those for the CM may be included. Then, a broadcasting confirmation report 5 is submitted from the broadcasting station 2 to the client 1. In the embodiment, the same contents 4 as are handed to the broadcasting station 2 are submitted to the broadcast verifying agent 6. The broadcast verifying agent 6 has a checking base 7 and is adapted to register a feature descriptor extracted from the contents 4 to a database (hereinafter referred simply to as a DB 8) in the checking base 7.

The DB 8 contains an ID number used to identify each of the contents 4, a title used to allow a human to understand the contents 4 with a single glance and a feature descriptor of the contents 4. Here, let it be assumed that the contents 4 is a CM. The ID number is issued every time the CM is registered on the DB 8 which is a number provided serially and uniquely. The title is a name of a product for which the CM is broadcast. Moreover, the feature descriptor is an amount of information provided at a speed of 16 bytes per second, 160 bytes per 10 seconds or 480 bytes per 30 seconds and the DB 8 stores large numbers of these pieces of the information.

A practical method for calculating the feature descriptor will be described below. Such methods as disclosed in Japanese Patent Application Laid-open No. 2000-259832 entitled "Image feature descriptor generating apparatus, image retrieving device and methods for generating feature descriptors and retrieving images" (hereafter referred to as a related technology) that has been applied by the applicant of the present invention can be employed. Since detailed description of the related technology is complicated, by using concrete examples, the technology is explained briefly.

That is, after an image is divided into blocks (8×8=64 pieces) and an average of the feature descriptors in each block is calculated, an 8 pixel×8 pixel thumbnail image (that is, a thumbsize image like an icon) is created. The thumbnail image looks as if the CM, image has become blurred, that is, as if it is an image that has passed through an LPF (Low Pass Filter). Moreover, since the CM image is a regular color image made up of three primary colors (Red, Green, and Blue), the thumbnail image (8 pixel×8 pixel) is created for every color. However, since the CM image is based or, a TV signal, it is exactly three images corresponding to three kinds of signals including Y (luminance) signal, R-Y (color difference) signal, and B-Y (color difference) signal, not the RGB color signals.

Then, a DCT (Discrete Cosine Transform) is performed on the thumbnail image to make a frequency conversion and information represented in frequencies corresponding to the 8×8 pixel image is obtained. Then, low frequency components are selected from information corresponding to the 8×8 pixel image. For example, six pieces of the low frequency components are selected from the Y signals, three pieces are selected from the R-Y signals, and three pieces are selected from the B-Y signals to obtain twelve pieces of the low frequency components in total. By roughly Quantizing these twelve coefficients, a total of 64 bits of information are extracted as the feature descriptor. When these coefficients are quantized, a quantizing characteristic is changed for every coefficient and the number of quantizing levels is changed. Thus, the information represented by the low frequency components contained in the CM image is obtained as the feature descriptor. The video signal is transmitted at 30 frames/sec and, in the embodiment, the feature descriptor of each frame is produced. However, it is not always necessary to produce the feature descriptor for all frames. The feature descriptors may be added, for example, at a rate of once per 2 seconds. This is partially because, if the feature descriptors are calculated for all frames, amounts of calculation increases and partially because if the feature descriptors for all frames are stored, the number of the CMs that can be registered on the DB 8 decreases. Therefore, a frame interval at which the feature descriptor is produced is determined depending on the need in -he broadcast verification system to make the check on the broadcasting of the CMs.

In FIG. 1, the checking base 7 is provided with a receiving device 9 used to receive broadcast waves, which is made up of an antenna, tuner, or a like. Then, a checking section 10 extracts the contents 11 from the broadcast wave received by the receiving device 9 and calculates feature descriptors of the broadcast wave from the extracted contents 11. Moreover, the checking section 10 calculates feature descriptors of contents 12 registered in the DB 8 and compares these two feature descriptors and outputs compared results to an aggregating section 14. The compared results may be transmitted directly to the client 1 by using an E-mail or a like.

The checking of contents is carried out basically by using the image checking method. As described above, the CMs for some health drinks and softdrinks have their many various versions and, even if the CMs have the same voices, in some cases, they have different images. In the case of the broadcast verification using the voice checking method, it is difficult to differentiate between these versions of the CMs. Therefore, it is preferable to perform broadcast verification not by the conventional voice checking but by the image checking. Since processing capability of a CPU has been improved dramatically in recent years, the broadcast verification by using the image checking method requiring a large amount of calculation is made possible.

Since detection accuracy can be more improved by using the image checking method and the voice checking method in combination, it is more preferable to perform broadcast verification by using the both image and voice checking methods with the conventionally known voice recognition technology. For example, since a start of the broadcasting of CMs can be detected by the voice checking method, a comparison may be made between the start time of broadcasting of CMs detected by the image checking method and that of broadcasting of CMs detected by the voice checking method. If both of the start time coincide with each other, it is possible to raise evidence capability that the broadcasting of CMs detected by the image checking method is truly the broadcasting of CMs. If both of the start time does not coincide with each other, it shows that there is a possibility that the broadcasting of CMs is erroneously detected.

In FIG. 1, the checking section 10 is so configured as to check image signals in real time by using the disclosed methods including the above related technologies. Then, the aggregating section 14, after the aggregation of a checked results 13, submits the aggregated results to the client 1 as a report 15. The checking section 10 may be so configured as to immediately submit checked results 13 to the client 1 by post mail, E-mail, or a like. The report 15 contains a registration number of the contents, broadcasting channel, broadcasting date, broadcasting time, broadcasting state, or a like. The broadcast verifying agent 6 receives a broadcast verification entrusting fee 16 as an equivalent for the checked results 13 or the report 15, from the client 1.

The broadcasting state represents a state as to whether a frame has not dropped, a voice has not bee interrupted, or a like in the broadcasting. The purpose of the broadcast verification is to verify whether a CM is broadcast in a predetermined time band and in the number of times as agreed between the client 1 and the broadcasting station 2. Therefore, a greatest concern of the client 1 is whether the CM has been correctly broadcast. When the broadcasting station 2 broadcasts a CM, in some cases, first one to two frames of a registered CM drop at a time when switching of a broadcast from an other CM is made and such a small drop of the frame is generally acceptable.

However, if three frames or more drop, it is customary with the broadcasting station 2 to pay a penalty to the client 1 and, therefore, when such drops of the frames are detected, this state is to be reported to the client 1. Moreover, though the generation of the feature descriptors described above for all the frames are not required, in order to detect the drop of even one or two frames, it is preferable to generate the feature descriptors for all frames. Since an accident that a voice is interrupted during broadcasting occurs sometimes, a check is made, by using the voice checking method in combination, as to whether the voice is interrupted and the checked result 13 is reported to the client 1.

Figure 2:
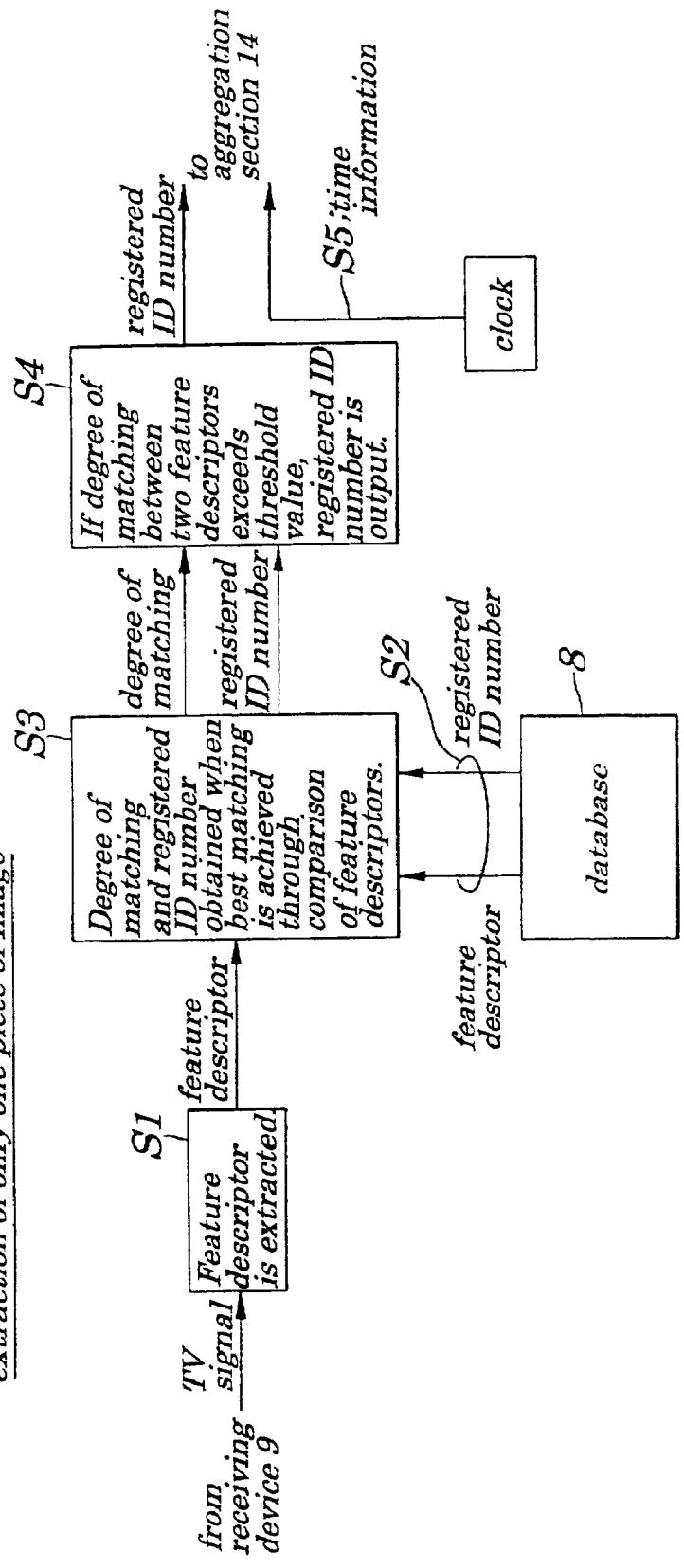
FIG. 2 is a flowchart explaining procedures for checking images in which a checking section extracts one piece of an image employed in the first embodiment of the present invention.
Figure 3:
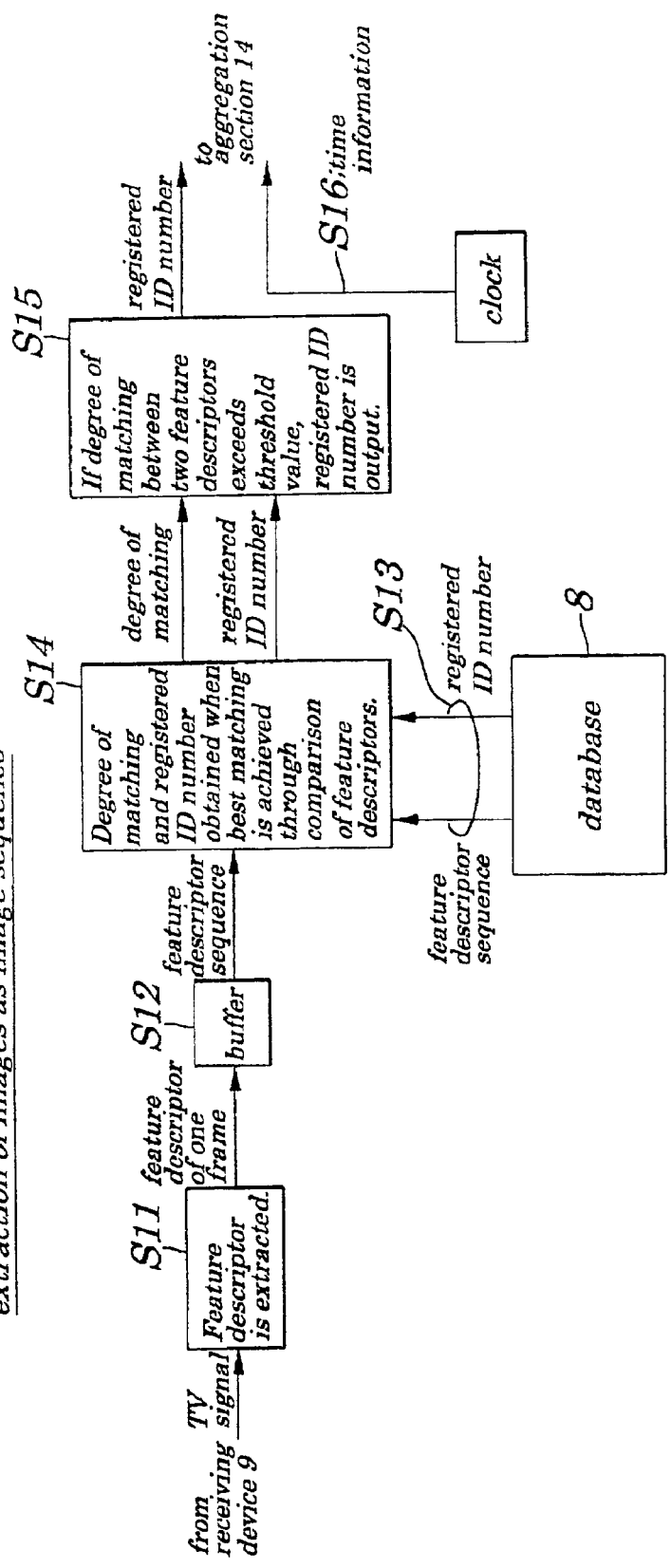
FIG. 3 is a flowchart explaining procedures in which the checking section extracts image sequences to perform broadcast verification according to the first embodiment of the present invention.

Procedures for checking image signals made by the checking section 10 are described below. FIG. 2 is a flowchart explaining procedures for checking images in which the checking section 10 extracts one piece of an image employed in the first embodiment of the present invention. FIG. 3 is a flowchart explaining procedures for checking images in which the checking section 10 extracts image sequences employed in the first embodiment of the present invention. FIG. 2 shows a case where one frame of a still image is detected to perform the image checking. FIG. 3 shows a case where a moving picture is detected to perform the image checking. In both cases, TV signals are received through the tuner, from which a feature descriptor is extracted and the feature descriptor of the TV signal is compared with that stored in the DB 8, and signals having a higher degree of matching in the feature descriptor are selected as a candidate and, if the degree of matching between these feature descriptors is higher than a threshold value, the signals are judged to be those for a CM.

The flowchart shown in FIG. 2 will be described first. The receiving device 9 receives TV signals and the feature descriptor for each frame is extracted from the received TV signals (Step S1). Next, a feature descriptor stored in the DB 8 is taken out together with a registered ID number from the DB 8 (Step S2) and the feature descriptor is compared with the feature descriptor extracted in Step S1 one by one. Then, at every comparison, the degree of matching in images (that is, a degree of similarity in images) is calculated and the feature descriptor stored in the DB 8 being similar to the feature descriptor of the input TV signal is selected and the degree of the matching between them is output together with the registered ID number (Step S3). Moreover, an average value obtained by calculating a distance between the two feature descriptors may be used as the degree of matching.

Then, the obtained degree of the matching is compared with a threshold value and, if the degree of the matching is low, the signals are judged to be not signals for a CM. On the other hand, if the degree of the matching between the two feature descriptors exceeds the above threshold value, a CM is considered to be detected and the registered ID number is output (Step S4). The output registered ID numbers are transmitted to the aggregating section 14 to undergo aggregate computation. At this point, since time information showing when the CM is detected is required, time information is taken out from a clock mounted in the checking base 7, which is added to the registered ID number and then transmitted to the aggregating section 14 (Step S5). The time information may be added at any step shown in FIG. 2 or the aggregating section 14 may be so configured as to add the time information to the registered ID number.

Next, the flowchart shown in FIG. 3 will be described below. Operations in the case of detection of image sequences are almost the same as those in the case of detection of one frame still image. Operations in the case of the detection of image sequences differ from those in the case of detection of one frame still image in that, after the feature descriptors for every frame are extracted (Step S11), the feature descriptor for one frame is stored in a buffer (Step S12) and then sequences of the feature descriptors obtained by collecting feature descriptions of a plurality of frames are output from the buffer. Procedures contained in Step S13 to S16 are exactly the same as those in Step S2 to S5 and their descriptions are omitted accordingly.

Thus, in the case of the detection of the image sequences, the broadcast verification is made on the feature descriptors obtained by collecting feature descriptors of past several tens of frames or past several hundreds of frames. Moreover, in this case, what is stored in the DB 8 is naturally a feature descriptor sequence. As described above, it is not always necessary to generate the feature descriptor sequence using feature descriptors of all frames and the feature descriptor sequence may be generated from feature descriptors obtained by calculating feature descriptors of every several frames.

The report 15 created by performing the aggregation on the checked results 13 contains the ID number provided to each of the CMs and start and end time of broadcasting the detected CM. To identify the CM, information about the end time of broadcasting the CM is not always required so long as the information about the ID number and the start time are available. Various methods for implementing the processing of the aggregation for creating the report 15 are possible. For example, the report 15 may be transmitted to the client 1 by an E-mail every time the CM is detected or the aggregation on the results may be performed at midnight every day, every week, or every month.

Every CM has a broadcasting length of five seconds, fifteen seconds, or thirty seconds and, in order to judge whether the detected CM is one that has been registered in the DB 8, it is not necessary to check all the length of the CM to be broadcast. For example, if a broadcasting length of the CM is thirty seconds, whether the detected CM is the one that has been registered in the DB 8 can be judged by checking the first ten seconds. Moreover, for example, if only two frames are used for one second in the judgement, twenty frames are used for the first 10 seconds in the judgement.

Therefore, even if a feature descriptor of one frame out of twenty frames accidentally coincides with that of one frame registered in the DB 8, when feature descriptors of other frames do not coincide with those of other frames registered in the DB 8, no erroneous detection of the CM occurs. Actually, in the system operating at a practical stage, detection rate of 99% or more has been achieved by the judgement for the first ten seconds. Moreover, in the case of the detection of a CM having a broadcasting length of more than thirty seconds, the judgement time may be increased or decreased appropriately depending on the length of the CM.

Moreover, some CMs have various versions in which only last portions of the CM are changed. For example, there are many cases in which a CM having the same contents is broadcast every week day and the CM whose end portions are changed so as to include a message "Please come to the near store" to customers living in a region is broadcast. In this case, it is preferable to use an entire of the CM for the judgement. Therefore, when a CM is to be detected, preferably, each of lengths of the CMs is registered in advance in the DB 8 and a length of the judgment time is made changeable depending on the CM to be detected.

Moreover, in the system of the embodiment, the threshold value is so set as to perform an excessively sensitive detection of CMs. By doing so, a case can be avoided in which the system fails to detect the CM that had been actually broadcast. As described later, the excessively and/or erroneously detected CMs can be re-checked by storing images of CMs in a separate hard disk or a VTR (Video Tape Recorder); that is, feature descriptors of all frames of the CMs stored in the hard disk or the VTR can be compared for the judgment, or all image data of each frame can be re-checked or the stored CM can be checked by visual observation.

Figure 4:
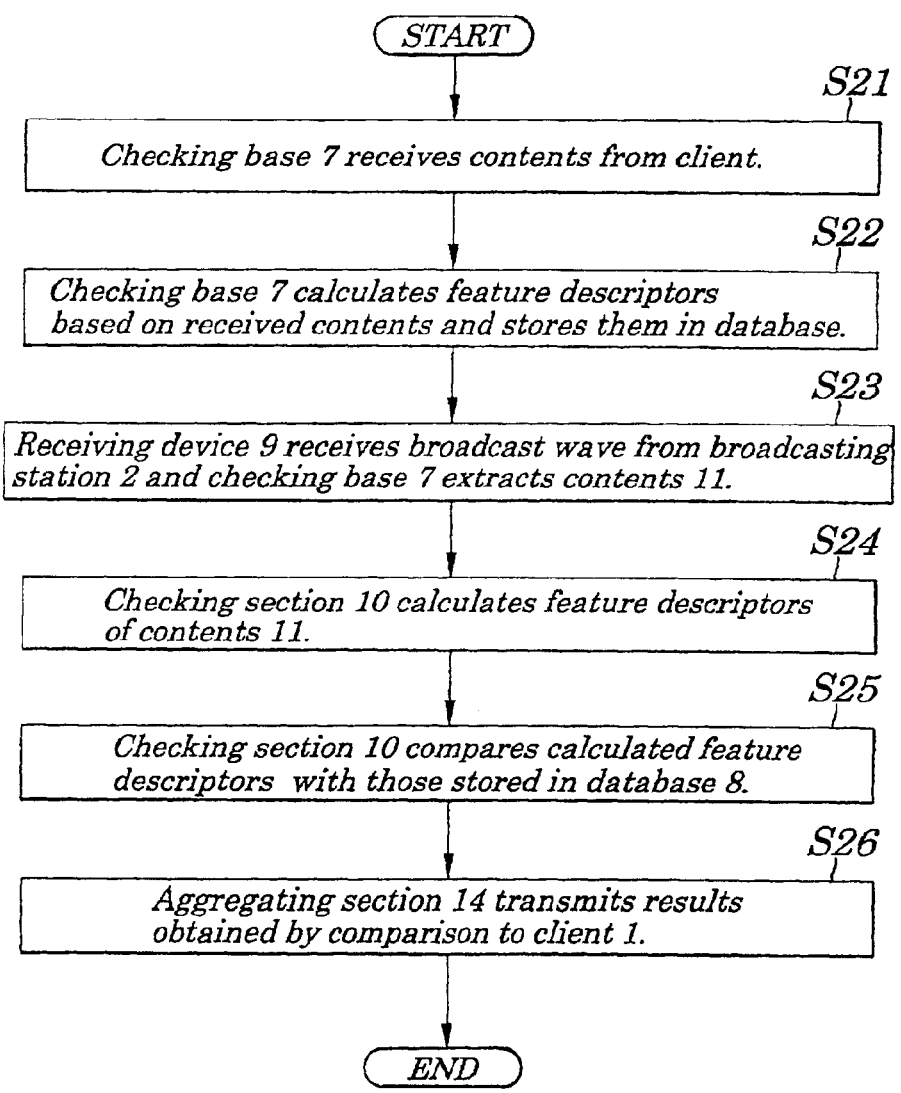
FIG. 4 is a flowchart explaining procedures in which a broadcast verifying agent checks feature descriptors of contents to perform broadcast verification, according to the first embodiment of the present invention.

FIG. 4 is a flowchart explaining procedures in which a broadcast verifying agent checks feature descriptors of contents to perform broadcast verification according to the first embodiment of the present invention. Operations to be performed by devices of the broadcast verifying agent will be described.

First, the checking base 7 receives the same contents as are broadcast by the broadcasting station 2 from the client 1 (Step S21). Next, the checking base 7 calculates feature descriptors based on the received contents 4 and stores the feature descriptors in the DB 8 (Step S22).

Next, the receiving device 9 receives broadcast waves from the broadcasting station 2 and transmits them to the checking base 7 and the checking section 10 of the checking base 7 extracts contents 11 from the broadcast wave (Step S23) and calculates feature descriptors of the contents 11 (Step S24). Then, the checking section 10 compares the calculated feature descriptors with those stored in the DB 8 (Step S25) and transmits results obtained by the comparison to the aggregating section 14. The aggregating section 14 performs the aggregation on the checked results 13 obtained by the comparison and transmits the report 15 to the client 1 (Step S26).

Moreover, according to the embodiment, feature descriptors of the contents are used so that the broadcast verification is made easily by using a personal computer. However, shortly, digital BS (Broadcasting by Satellite) broadcasting starts and, from 2003, digital broadcasting using a ground wave is scheduled to start. Thus, there is a likelihood that contents themselves are digitized. It is expected that the broadcast verification is performed by directly checking a part of image signals or a whole of image signals.

Since, if all pixels contained in the contents are to be checked, an amount of computation becomes large, and therefore there is a possibility that a main frame or a super computer has to be used to perform broadcast verification in real time. However, when improvements in performance of microprocessors are considered, the broadcast verification system can be fully implemented by using even personal computers. Moreover, to store CM images themselves to the DB 8, a capacity of the DB 8 must be large, however, if the number of the CMs that can be registered on the DE 8 can be limited, no problem with the storage capacity occurs.

Thus, if all or a part of the contents themselves is used for the broadcast verification, not feature descriptors of the contents but the contents themselves are to be registered. Moreover, the checking section 10 performs matching between image data of contents, that is, compares images of the CMs registered on the DB 8 with those of the contents 11 extracted from the broadcasting waves for every frame to calculate a degree of the matching between them. Conventional methods of retrieving similar images including a color histogram method, dominant color method or a like may be used as the method of detecting images. In the color histogram method, a constitutional ratio of colors is used by dividing a color space and obtaining a ratio of pixels contained in the divided color space for retrieval. The dominant color method is a simplified color histogram method in which the retrieval is performed by using spatial arrangement of colors.

Figure 5:
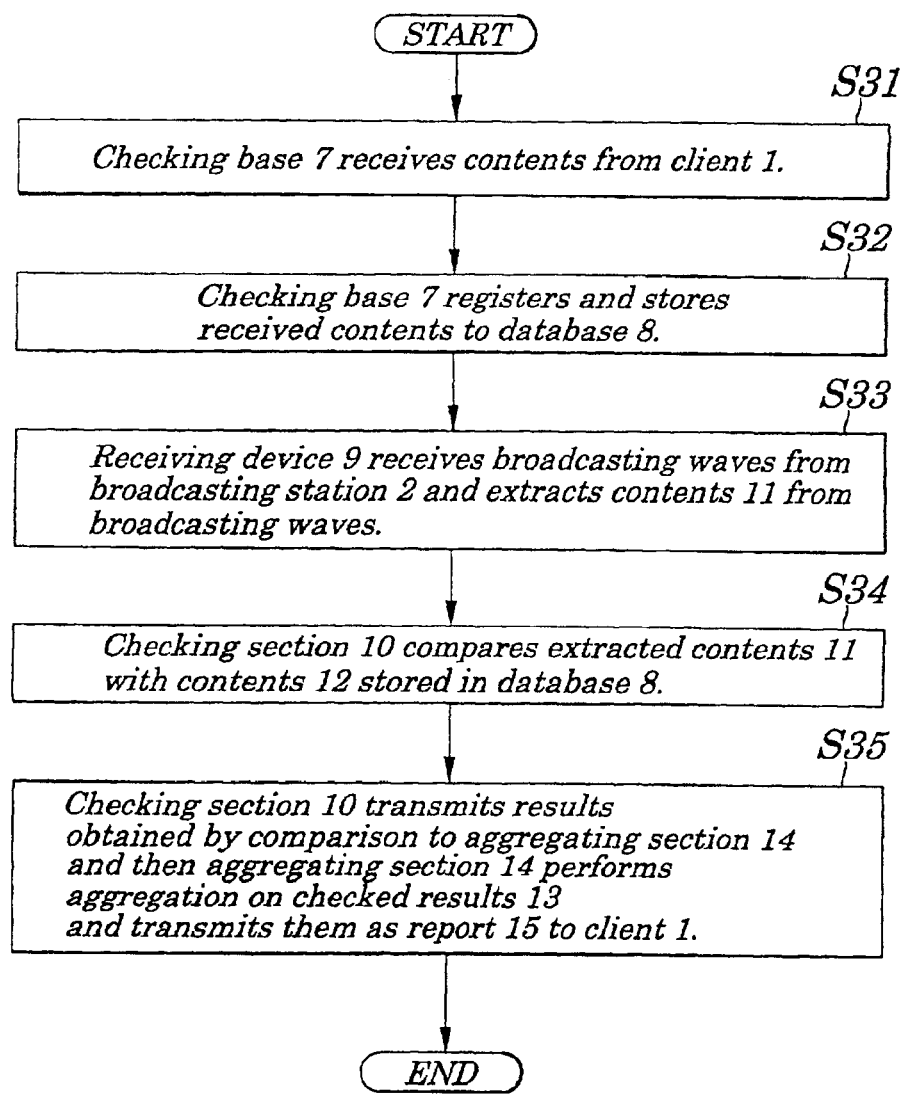
FIG. 5 is a flowchart explaining procedures taken when a broadcast verifying agent performs broadcast verification by checking contents themselves, according to the first embodiment of the present invention.

Next, operations in the side of the broadcast verifying agent 6 will be described by referring to FIG. 5 which is a flowchart explaining procedures taken when the broadcast verifying agent 6 performs the broadcast verification by checking contents themselves employed in the first embodiment of the present invention.

First, the checking base 7 receives contents 4 from the client 1 (Step S31) and registers and stores the received contents 4 to the DB 8 (Step S32). Then, the receiving device 9 receives broadcasting waves from the broadcasting station 2 and extracts the contents 11 from the broadcasting waves (Step S33). The checking section 10 compares the extracted contents 11 with the contents 12 stored in the DB 8 (Step S34). The checking section 10 transfers checked results 13 obtained by the comparison to the aggregating section 14 and then the aggregating section 14 performs the aggregation on the checked results 13 and transmits them as the report 15 to the client 1 (Step S35).

Moreover, in FIG. 1, only one pair of the receiving devices 9 is mounted in the embodiment. However, actually, since programs are simultaneously broadcast on many channels, to perform the broadcast verification on CMs broadcast on many channels, the checking base 7 shown in FIG. 1 that can correspond to the number of the channels has to be provided. The broadcast verification system may be so configured that the receiving device 9, checking section 10 and aggregating section 14 corresponding to the number of the channels are mounted and that the DB 8 is commonly used, or that the receiving device 9 and checking section 10 corresponding to the number of the channels are mounted and the DB 8 and aggregating section 14 are commonly used. When the broadcast verification is made on the CMs broadcast on many channels, information about the channel (for example, 1 channel, 3 channels, or 4 channels) on which the CM is broadcast and detected is added to the resort 15.

Furthermore, procedures for exchange of a contract sheet signed in the contract 3, submission of the broadcasting confirmation report 5 and payment of the broadcast verification entrusting fee 16 may be performed manually or automatically by using E-mail, E-money, and in accordance with an E-commerce rule.

Thus, according to the embodiment, since the broadcast verification is made by extracting feature descriptors from contents, it is possible to implement the broadcast verification by using only the received contents. That is, the broadcast verification system of the present invention has an advantage in that it is not necessary to incorporate specified information such as an identification number into contents, unlike the conventional system. If the identification number has to be incorporated into the contents as in the case of the conventional system, the broadcast verification cannot be implemented unless the identification number is available.

Additionally, unlike the conventional system, in the broadcast verification system of the present invention, since contents themselves such as the CM images can be easily obtained, the broadcast verification can be made even on a CM that was broadcast by a broadcasting station 2 with which the contract 3 has not been signed.

Second Embodiment

Figure 6:
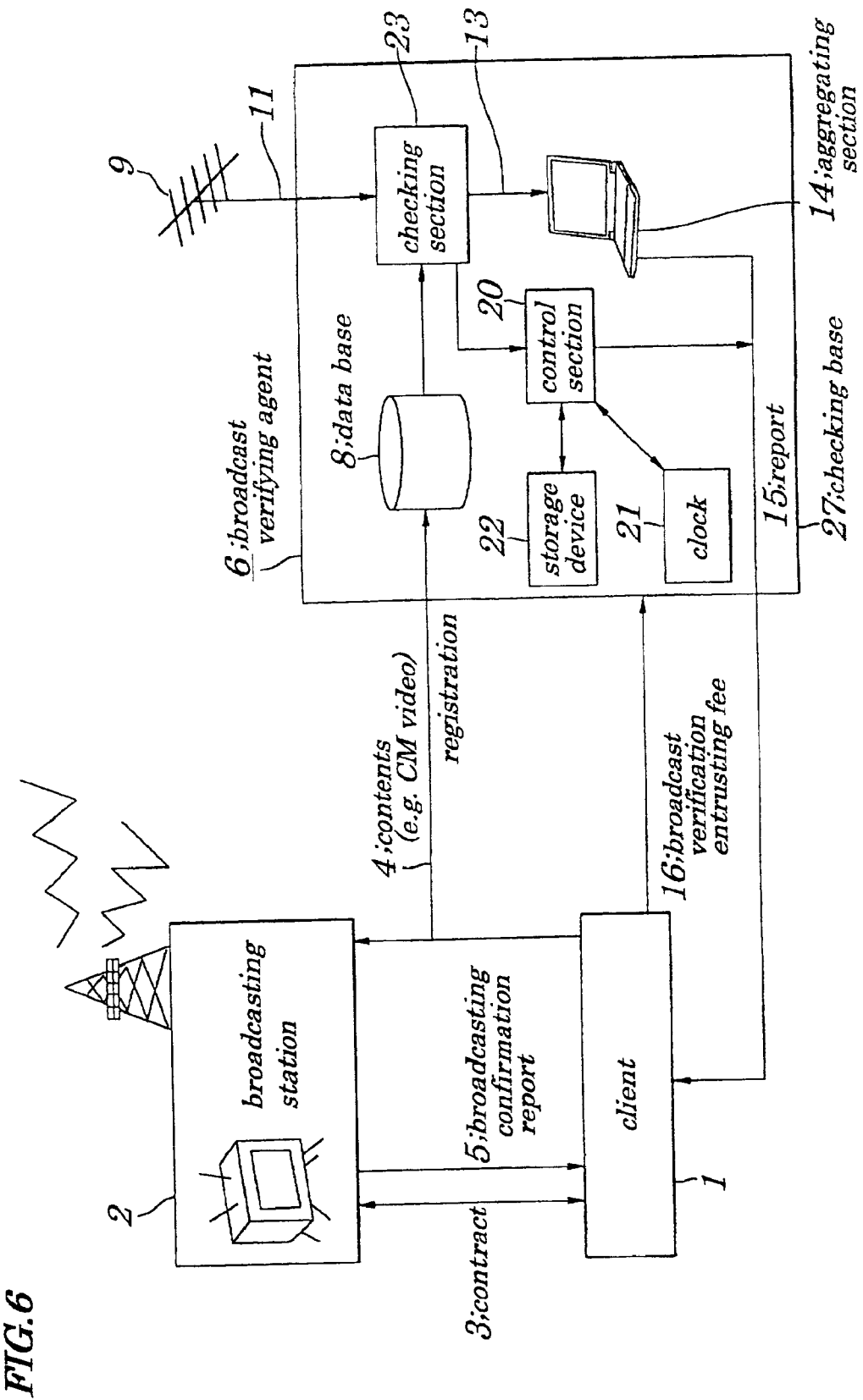
FIG. 6 is a schematic block diagram showing configurations of a broadcast verification system according to a second embodiment of the present invention.

There is a danger that a checking result of a CM submitted, as a report, to a client as is employed in the first embodiment, is not sufficient to give full evidence certifying that a broadcast verification has been accurately made. In a second embodiment of the present invention, a means that can certify that a broadcast verifying agent 6 has duly made the broadcast verification is provided. FIG. 6 is a schematic block diagram showing configurations of a broadcast verification system according to the second embodiment of the present invention. In FIG. 6, same reference numbers are assigned to components having the same functions as in the first embodiment.

In this embodiment, a control section 20, a clock 21 and a storage device 22 are added to configurations of the first embodiment shown in FIG. 1. As shown in FIG. 6, a checking section 10 shown in FIG. 1 is given as a checking section 23 having additional functions. Moreover, due to such differences in configurations, instead of a checking base 7 shown in FIG. 1, in FIG. 6, a checking base 27 is provided. The storage device 22 is used, when a CM is detected by the checking section 23, to store only CM images extracted from contents 11 contained in a received broadcasting wave, which may be configured by using a hard disk device, VTR or a like (not shown).

Next, the clock 21 is used to generate time information required for giving a time stamp to CM images stored in the storage device 22, which can be the same as a clock shown in FIG. 2 or 3. A timing generating section (that is, the control section 20) receives a notification of the CM detection and a CM image extracted from the contents 11 from the checking section 23. When the checking section 23, after having completed the detection of CMs, transmits CM images to the control section 20, a buffer or a delay line may be used. When the buffer (not shown) is used, the checking section 23 may store images of contents 11 within the buffer and, at a time when it detects the CM, may cut only the CM image from the buffer and may transmit it to the storage device 22. When the delay line (not shown) is used, the checking section 23 performs the CM detection by using contents which do not pass through the delay line, to cut the CM images, contents are input to the delay line. Then, at the time when the CM is found to be detected, only the CM image is cut from contents which are output, with a delay, from the delay line, and is transferred to the control section 20.

The control section 20 is adapted to set, in accordance with the notification of the CM detection, the timing for a start and end of storing CM images. Moreover, the timing generating section, control section 20, when the CM image is stored in the storage device 22, stores time information obtained from the clock 21 as a time stamp, together with the CM image extracted from contents. At this point, the time stamp may be stored in a region other than an area where the CM image is stored or it may be superimposed on the CM image in a manner that it is contained in the CM image. Here, if a hard disk is used as the storage device 22, the CM image may be stored with it compressed. The timing for terminating the CM image may be set so that the storing of the CM image ends after a predetermined time has elapsed since the start of the storing (for example, 15 seconds, 30 seconds, 60 seconds, or 90 seconds being equal to a length of the CM, or uniformly 120 seconds being equal to a full length of the CM). The checking section 23 also may detect the termination of the CM broadcasting and may notify the control section 20 of the result.

In this embodiment, the control section 20, when the checking section 23 detects a CM from contents, stores image data of the CM, together with the time stamp obtained from the clock 21, to the storage device 22. This certifies when each of the CMs described in a report 15 was broadcast actually. The control section 20, in cooperation with an aggregating section 14, may transmit the recorded CM image with it attached to the report 15 to a client 1 by an E-mail. If data amount of the CM image is large, the control section 20 may transfer the CM image to a magnetic-optical disk or a like and may send the magnetic-optical disk to the client 1.

Thus, according to this embodiment, the broadcast verifying agent 6 can submit the report 15 having higher evidence capability to the client 1. Moreover, the technology employed in this embodiment may be applied to other embodiments of the present invention described below. In doing so, the same functions as used in this embodiment are added to the checking section 23 and appropriate configurations may be added to the control section 20, clock 21, and storage device 22.

Third Embodiment

Figure 7:
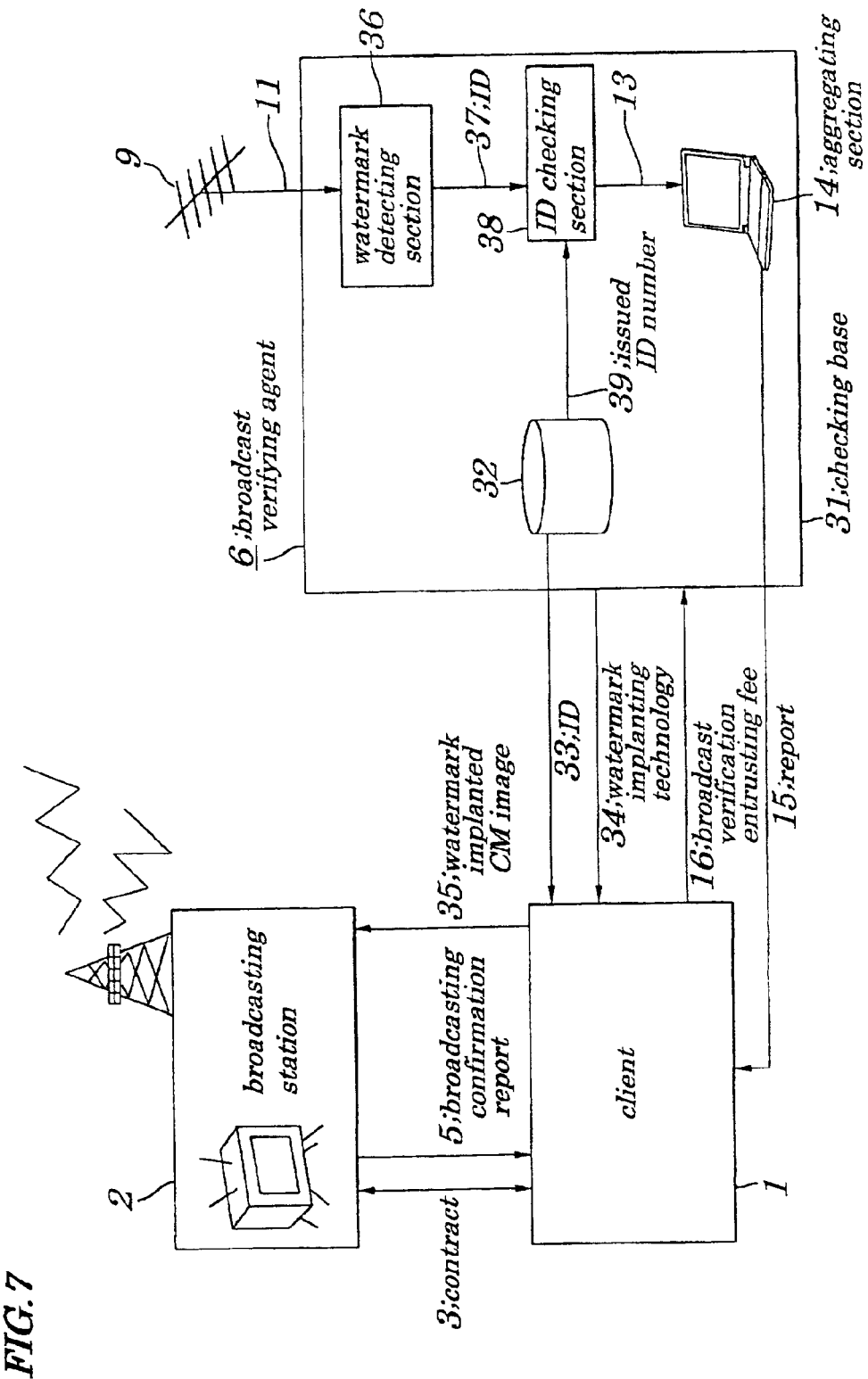
FIG. 7 is a schematic block diagram showing configurations of a broadcast verification system according to a third embodiment of the present invention.

FIG. 7 is a schematic block diagram showing configurations of a broadcast verification system according to a third embodiment of the present invention. In FIG. 7, same reference numbers are assigned to components having the same functions as in the first embodiment. In the embodiment, a DB 32 within a verification base 31, every time contents to be broadcast are registered on the DB 32, issues an ID number 33 being a unique number assigned to each of the contents to a client 1. At this point, the ID number 33 issued to the client 1 is also stored into the database 32 in the checking base 31 on the broadcast verification agent 6 side as the issued ID number 33. The configurations of the DB 32 are the same as a DB 8 shown in FIG. 1 except that the ID number 33, instead of feature descriptors, is registered. Moreover, the ID number 33 may be provided to each of the clients 1, not to each of the contents, as a unique client number. In this case, the ID number 33 is used as information for the broadcast verifying agent 6 to identify a client 1. The client 1 may assign a number corresponding to each of the contents that are asked to be broadcast to the ID number 33. The client 1 can expand the ID number 33; that is, if a value of the ID number 33 is "100", the ID number can be expanded to be "100-1" and "100-2" by adding an order number corresponding to each of the contents, However, in the description below, it is assumed that the ID number 33 is issued for each of the contents.

Next, the broadcast verifying agent 6, in order to implant the ID number 33 as a watermark in the contents, provides watermark implanting technology 34 to the client 1. Several methods for providing the watermark implanting technology 34 are available which generally include a method in which the watermark implanting technology 34 can be used instantly and another method in which some considerations are preferably given to a point that the client 1 does not like to transfer the CM image in advance to a third party. In this embodiment, a device that can implant the watermark in a form of a black box is provided or the watermark implanting technology 34 is provided in a form of software or a program. The broadcast verifying agent 6, when giving the watermark implanting technology 34 to the client 1, collects a license fee from the client 1.

The digital watermarking technology for making a digital watermark used in the embodiment will be briefly described below. The watermark represents an unerasable mark that is inserted into contents including a images, voice, text, or a like, which, by inserting it as a mark of an owner of content data, enables a copyright holder to be identified. The watermark is expected as a system to protect a copyright and further is used as a label that cannot be separated from the contents.

Various methods for implanting the watermark to contents or for detecting the watermark from contents have been reported. A simplest method for implanting the watermark is to select some pixels placed at a specified position of an image and to write the watermark as its least significant bit (LSB) information. Another method is to convert, when the watermark is implanted, images into frequency distribution levels by using an FTT (Fast Fourier Transform) and implant the information into image signals converted into the frequency distribution levels. This method can avoid influences on the image and can write watermark information in an area where the information is not easily erased by noises.

The method for detecting the watermark can be classified under three chief groups; (1) a method for detecting watermarks through comparison with original images, (2) a method for detecting watermarks using key information being known only by a specified person, and (3) a method for detecting watermarks from received images without using neither the original image nor the key information. The above detection method (1) using the original images is implemented by a transfer of original images from the client 1 to the broadcast verifying agent 6. The method (2) or (3) using no original image is preferable to the method (1) because there is no need of the transfer of the image from the client 1 to the broadcast verifying agent 6 at each time of broadcasting and because the client 1 does not desire to transfer the original image to other parties. Thus, though there are various methods that can be used to implement the digital watermarking technology, any method may be used wren the digital watermarking technology is employed in this embodiment.

Again, referring to FIG. 7, the procedure in which the client 1 signs a contract 3 concerning the CM broadcasting with a broadcasting station 2 is the same as in the first embodiment. However, in the embodiment, the client 1, by using the watermark implanting technology 34, implants the ID number 33 in contents desired for broadcasting and submits them as a watermark implanted CM image 35 with the watermark implanted. The broadcasting station 2 broadcasts the CM using the watermark implanted CM image 35 with the watermark implanted.

Next, a watermark detecting section 36 in the checking base 31 judges whether there exists the watermark in contents 11 contained in a broadcasting wave received by a receiving device 9 and, if it exists, detects the ID number implanted in contents 11 and outputs the detected ID number as the ID number 37. If no watermark is detected, the watermark detecting section 36 outputs a signal showing that the watermark has not been detected or outputs nothing. Then, an ID verification section 38 compares the ID number 37 detected from the broadcasting wave with an issued ID number 39 stored in the database 32 and outputs comparison results 13. As in the case of the first embodiment, the comparison results 13 are transmitted to the client 1. That is, as shown in FIG. 7, the comparison result 13, after having undergone aggregation at an aggregating section 14, is submitted to the client 1 as a report 15 or is submitted immediately to the client 1 through an mail or a like.

Moreover, as in the case of the first embodiment, the broadcast verifying agent 6 receives a broadcast verification entrusting fee 16 as an equivalent for the comparison result 13 or the report 15 from the client 1. As in the case of the first embodiment, in this embodiment, the client 1 may be a broadcasting station which is distributing news images, in which case, the broadcasting station 2 in FIG. 7 serves as other broadcasting station to which the broadcastings station 2 is distributing images. A watermark implanted CM image 35 may be applied not only to the CM broadcasting but also to image broadcasting other than that of the CM.

Figure 8:
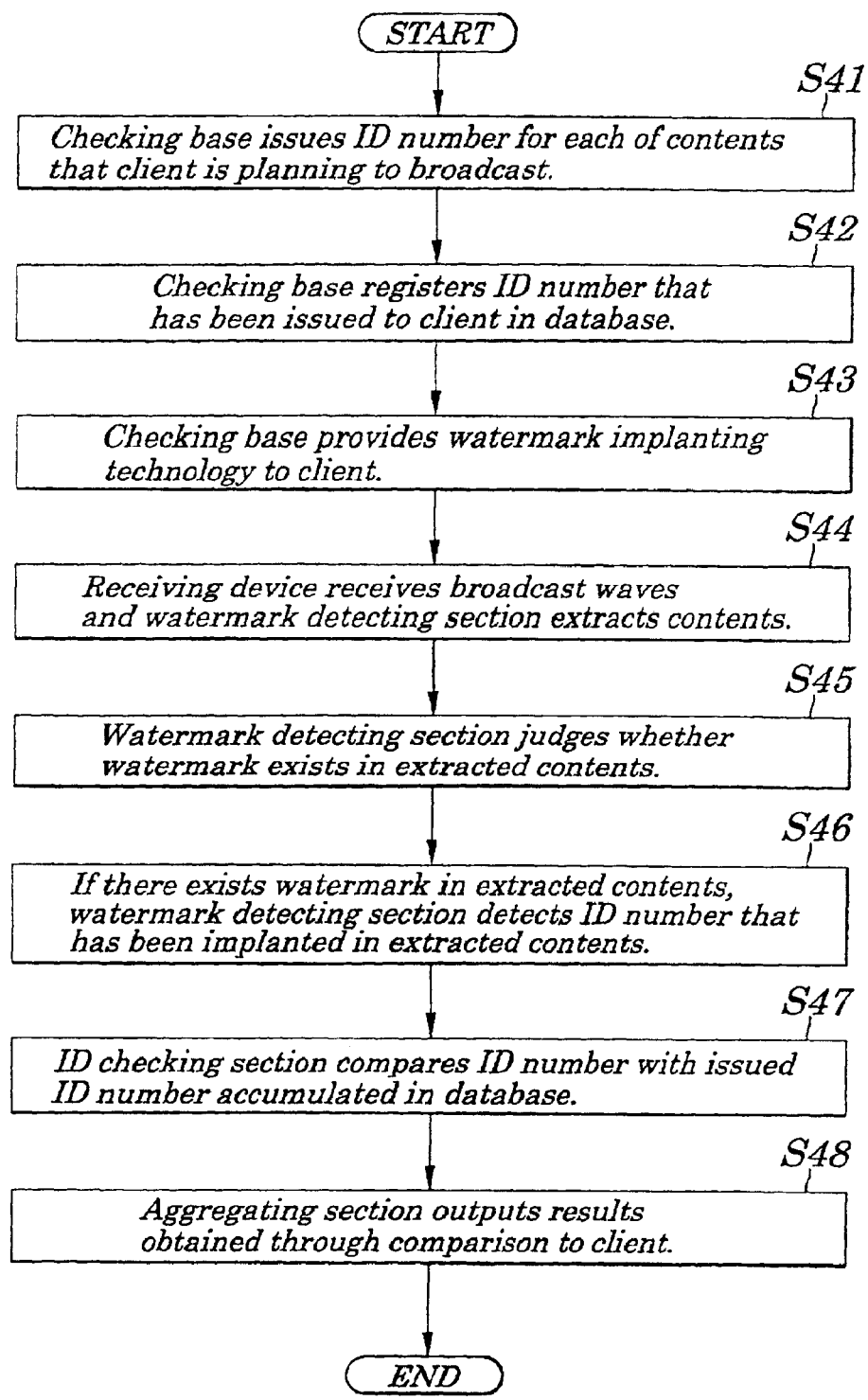
FIG. 8 a flowchart explaining procedures taken when a broadcast verifying agent performs broadcast verification by checking an ID (Identification) number implanted with digital watermarking technology, according to the third embodiment of the present invention.

FIG. 8 a flowchart explaining procedures taken when the broadcast verifying agent 6 performs the broadcast verification by identifying the ID number 33 implanted by digital watermarking technology, according to the second embodiment of the present invention. The checking base 31 issues the ID number 33 for each of the contents that the client 1 is planning to broadcast, to the client 1 (Step S41). At this point, the checking base 31 registers the ID number 33 that has been issued to the client 1, in the DB 32 (Step S42). The checking base 31 provides the watermark implanting technology 34 to the client 1 (Step S43). The watermark implanting technology 34 can be provided in a form of software. If the client 1 implants the ID number 33, the watermark implanting technology 34 is in advance supplied from the broadcasting checking agent 6 to the client 1. Then, the client 1 implants the ID 33 using the watermark in a CM and the watermark implanted CM image 35 is submitted to the broadcasting station 2 which broadcasts the CM. The receiving device 9 in the broadcast verifying agent 6 receives broadcast waves from the broadcasting station 2. Then, the watermark detecting section 36 in the checking base 31 extracts contents 11 from the broadcasting wave (Step S44) and judges whether the watermark exists in the extracted contents 11 (Step S45). If there exists the watermark in the extracted contents 11, the watermark detecting section 36 detects the ID number 37 that has been implanted in the extracted contents 11 (Step S46). The ID checking section 38 compares detected ID 37 with the issued ID number 39 accumulated in the DB 32 (Step S47). Then, the ID checking section 38 outputs compared results 13 obtained through the comparison and the aggregating section 14 creates the report 15 from the compared results 13 and outputs it to the client 1 (Step S48).

Thus, according to the embodiment, the broadcast verification system, since the watermark implanting is carried out by the client 1, is excellent in immediacy in operations. For example, in a case of distribution of a news video, from a nature of the news video, the distribution of the news video can not be registered on the checking base 31 on the broadcast verifying agent 6 side. That is, in this case, the news video prepared by the client 1 has to be distributed. This is because there is no room for the broadcast verifying agent 6 to implant the watermark in the news video and because the client 1, after implanting the watermark, has to distribute it as immediately as possible. The broadcast verification system is suitable for use in which the immediacy in operations is needed.

Fourth Embodiment

Figure 9:
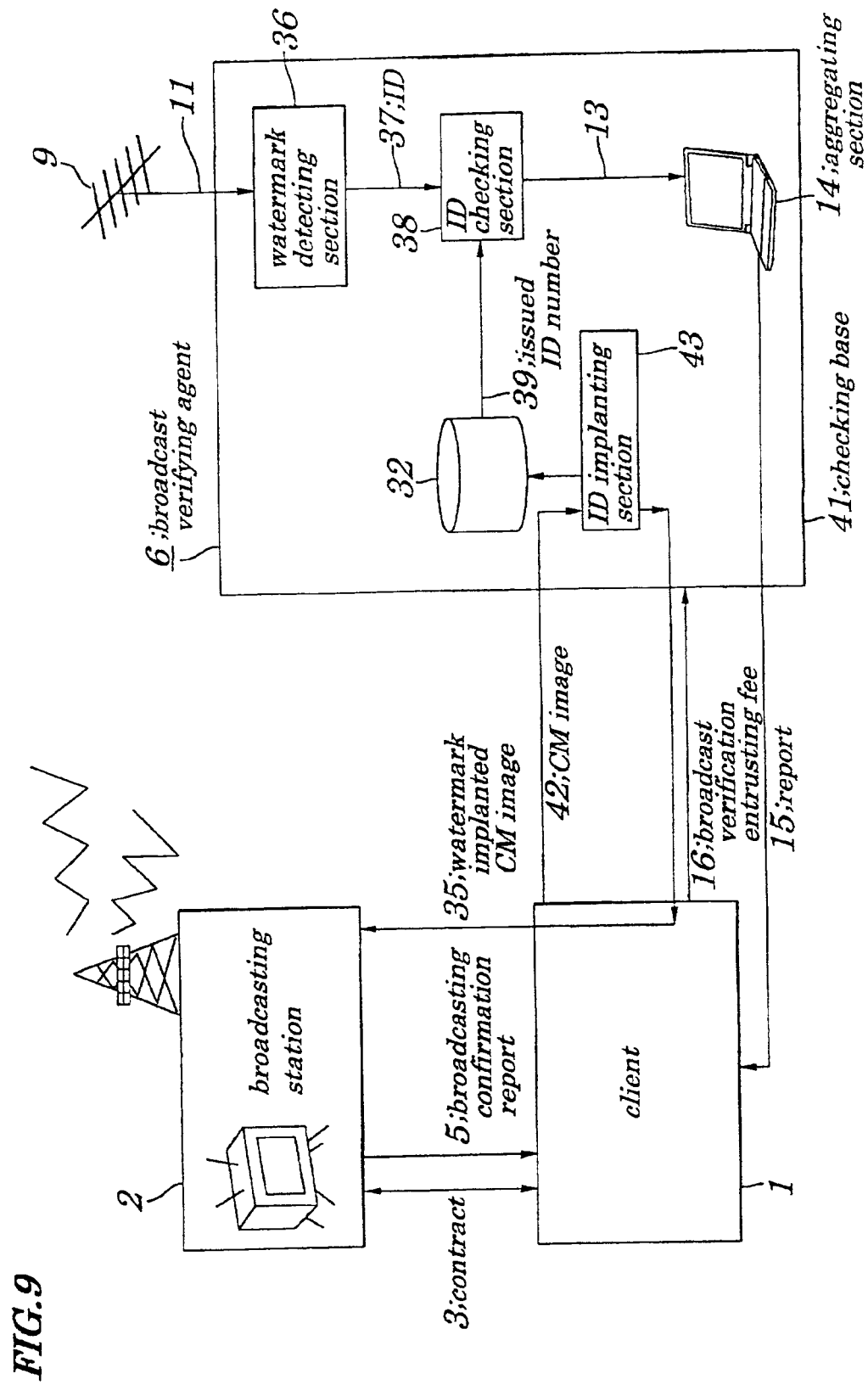
FIG. 9 is a schematic block diagram showing configurations of a broadcast verification system according to a fourth embodiment of the present invention.

FIG. 9 as a schematic block diagram showing configurations of a broadcast verification system according to a fourth embodiment of the present invention. In FIG. 9, same reference numbers are assigned to components having the same functions as in the third embodiment. Configurations of the broadcast verification system of the fourth embodiment are basically the same as those in the third embodiment and differ from those in the third embodiment in that, an implantation of an ID number using a digital watermarking technology is carried out by a broadcast verifying agent 6, not by entrusting a client 1 to do that. That is, according to this embodiment, a checking base 41 receives, from the client 1, contents of images or voices (that is, CM images 42) that the client 1 desires to broadcast.

In the checking base 41, an ID implanting section 43 implants an ID number for each of contents of the CM image 42 and returns this back to the client 1. The client 1 entrusts a broadcasting station 2 to broadcast the CM images 42 with the ID number implanted. The ID implanting section 43 registers the ID number implanted in the CM image 42 on a DB 32. All operations following this step are the same as those in the third embodiment. Moreover, in this embodiment, since the client 1 transfers the CM images 42 to the broadcast verifying agent 6, any one of the above-mentioned methods (the above-mentioned methods 1 to 3) for the digital watermarking technology may be used.

Figure 10:
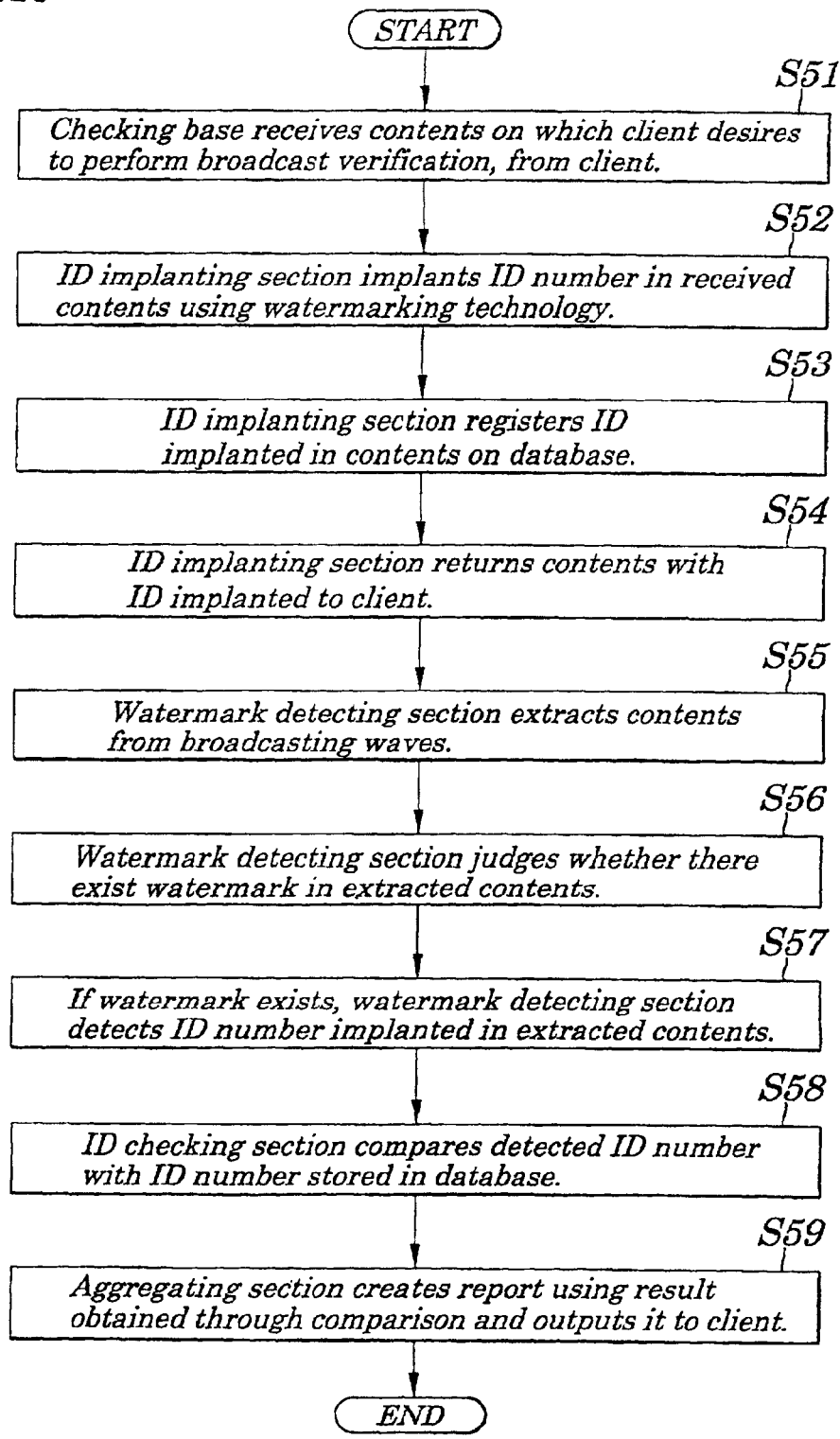
FIG. 10 a flowchart explaining procedures taken when a broadcast verifying agent performs broadcast verification by checking an ID number implanted with digital watermarking technology, according to the fourth embodiment of the present invention.

FIG. 10 a flowchart explaining procedures taken when the broadcast verifying agent 6 performs broadcast verification by checking the ID number implanted with digital watermarking technology, according to the fourth embodiment. First, the checking base 41 receives the CM image 42 on which the client 1 desires to perform broadcast verification, from the client 1 (Step S51). Next, the ID implanting section 43 implants the ID number in the received CM image 42 using the digital watermarking technology (Step S52). At this point, the ID implanting section 43 registers the ID implanted in the CM image 42 on the DB 32 and accumulates it (Step S53). Next, the ID implanting section 43 returns the contents with the ID implanted to the client 1 (Step S54).

The client 1 transfers the contents with the ID implanted to the broadcasting station 2 as a watermark implanted CM image 35 in order to entrust the broadcasting station 2 to broadcast the watermark implanted CM image 35. Then, on the broadcast verifying agent 6, a receiving device 9 receives broadcasting waves from the broadcasting station 2. The watermark detecting section 36 in the checking base 41 extracts contents 11 from the broadcasting waves (Step S55). A watermark detecting section 36 judges whether there exists the watermark in the extracted contents 11 (Step S56).

If the watermark exists, the watermark detecting section 36 detects the ID number implanted in the extracted contents 11 and outputs it as an ID 37 (Step S57). Next, an ID verification section 38 compares the detected ID number 37 with the ID number stored in the DB 32 (Step S58) and outputs results obtained by the comparison to an aggregating section 14, The aggregating section 14 creates a report 15 using the result from the ID checking section 38 and outputs it to the client 1 (Step S59).

Fifth Embodiment

Figure 11:
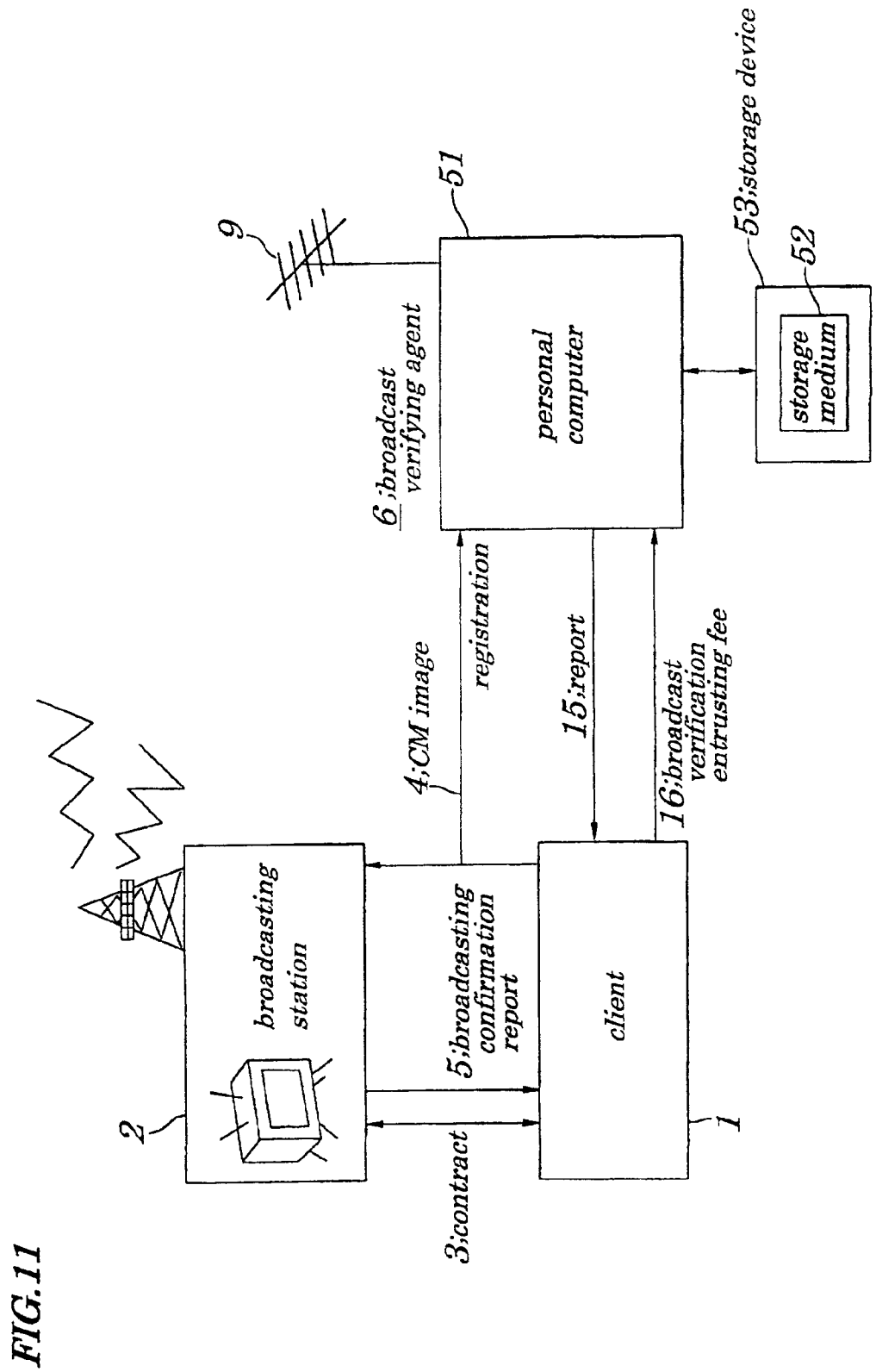
FIG. 11 is a schematic block diagram showing configurations of a broadcast verification system according to a fifth embodiment of the present invention.

In each of the above embodiments, an exclusively designed device to be used as a checking base on a broadcast verifying agent is employed, however, in this embodiment, an ordinary personal computer is used. FIG. 11 is a schematic block diagram showing configurations of a broadcast verification system according to a fifth embodiment of the present invention. In FIG. 11, same reference numbers are assigned to components having the same functions as in the first embodiment. Basic operations of the broadcast verification system of the fifth embodiment are the same as those in the first embodiment except that a personal computer 51 and a storage device 53 are employed.

In the embodiment, a program (hereinafter being referred to as a "broadcast verification program") or data used to execute processing to be performed by a broadcast verifying agent 6 is stored in a storage medium 52 and the broadcast verification program is loaded from the storage medium 52 on the personal computer 51. The broadcast verification program controls operations of each of hardware making up the personal computer 51. Specified processing designated by the broadcast verification program is carried out. Therefore, the broadcast verification system provided for the broadcast verifying agent 6 of the fifth embodiment includes a receiving device 9 made up of an antenna and a tuner, the personal computer 51 being equivalent to a checking base 7 shown in FIG. 1 and the storage device 53 having computer-readable storage medium 52. The personal computer 51 has functions which are equivalent to functions of each of components making up the checking base 7 shown in FIG. 1. A file mounted on a hard disk in the personal computer 51 in FIG. 11 serves as a DB 8 in FIG. 1. Moreover, a checking section 10 and an aggregating section 14 in FIG. 1 are implemented by having the personal computer 51 execute the broadcast verification program stored in the storage medium 52. Processing contents of the broadcast verification program are the same as those explained in the first embodiment. Though not shown, to the personal computer 51 are connected an input device, display device, and a like as peripheral devices. The input device is made up of input devices such as a keyboard, mouse, and a like. The display device is made up of a CRT (Cathode Ray Tube), LCD (Liquid Crystal Display), or a like. The broadcast verification may be implemented by storing the broadcast verification program in the computer-readable storage medium 52 and by having the personal computer 51 execute the broadcast verification program stored in the storage medium 52. This situation is shown in FIG. 11. The personal computer 51 includes an OS (Operating System), peripheral devices, and a like. The computer-readable storage medium 52 is made up of a floppy disk, hard disk, magneto-optical disk, non-volatile memory such as a flash memory, CD-ROM (Compact Disk-read-only Memory), volatile-memory such as a RAM (Random Access Memory), or a combination of them. The personal computer 51 is made up of a CPU, main memory, or a like and loads the broadcast verification program to implement the same functions as those in the checking base 7 in FIG. 1 on the main memory to execute the programs.

Moreover, the computer-readable storage medium includes a storage medium to hold the program for a specified period of time like a memory within the personal computer 51 which serves as a server or client used when the broadcast verification program is transmitted through a network such as the Internet, or a like, and/or communication lines such as telephone lines. The broadcast verification program may be transmitted from the personal computer 51 in which the broadcast verification program has been stored in its storage device 53 through a transmission medium or by transmission waves to another computer system.

The "transmission medium" used to transmit the program represents a medium having a function to transmit information like a communication line such as a telephone line, or a like, and/or the network such as the Internet. The broadcast verification program may be a program that can implement a part of the functions realized in the first embodiment or a program (that is, a difference program) that can implement the functions realized in the first embodiment by combining programs already stored in the personal computer system.

Configurations of the broadcast verification system of the fifth embodiment are the same as those in the first embodiment except that the broadcast verification program, when the broadcast verification is performed, is loaded from the storage medium 52 on the personal computer. It has been confirmed by inventors of the present invention that about 50,000 pieces of CMs stored in the DB 8 can be detected by one computer in real time.

It is apparent that the present invention is not limited to the above embodiments but may be changed and modified without departing from the scope and spirit of the invention. For example, in each of the above embodiments, the broadcast verification is performed in real time using the broadcasting waves that are being received actually. However, the broadcast verification may be made by storing CM images in a videotape and playing it back.

What is claimed is:

1. A broadcast verification system made up of a broadcasting station, a client entrusting said broadcasting station to broadcast contents including images, and a broadcast verification apparatus to verify whether said contents are broadcast as agreed to by a contract between said broadcasting station and said client, said broadcast verification apparatus comprising:

a feature descriptor calculating means to calculate a feature descriptor of said contents that said client entrusted said broadcasting station to broadcast;

a storing means to store said feature descriptor of said contents;

a comparing means to calculate said feature descriptor of contents detected from broadcasting waves transmitted from said broadcasting station and to compare said feature descriptor obtained by said calculation with said feature descriptor stored in said storing means;

a reporting means to report a comparison result obtained by said comparison to said client; and wherein said client checks, by acquiring said comparison result, whether said contents entrusted by said client to be broadcast have been broadcast.

2. A broadcast verification system made up of a broadcasting station, a client entrusting said broadcasting station to broadcast contents including images, and a broadcast verification apparatus to verify whether said contents are broadcast as agreed to by a contract between said broadcasting station and said client, said broadcast verification apparatus comprising:

an identification number storing means to store an identification number assigned to said contents that said client entrusted said broadcasting station to broadcast, a comparing means to take out said identification number implanted, by using digital watermarking technology making a digital watermark, in contents detected from broadcasting waves broadcast by said broadcasting station and to compare said identification number with said stored identification number;

a reporting means to report a comparison result obtained by said comparison to said client; and wherein said client has a watermark implanting section to implant said identification number assigned to said contents that said client wants to broadcast, by using said watermarking implanting technology, and entrusts said broadcasting station to broadcast said contents and checks, by acquiring said comparison result, whether, contents entrusted by said client to be broadcast have been broadcast.

3. A broadcast verification system made us of a broadcasting station, a client entrusting said broadcasting station to broadcast contents including images, and a broadcast verification apparatus to verify whether said contents are broadcast as agreed to by a contract between said broadcasting station and said client, said broadcast verification apparatus comprising:

an implanting means to assign an identification number to each of said contents transmitted from said client and to implant said identification number in each of said contents by using a digital watermarking technology making a digital watermark and to return it to said client;

a storing means to store said identification number that has been implanted in said contents returned back to said client;

a comparing means to take out said identification number implanted, using digital watermarking technology, in said contents detected from broadcasting waves broadcast by said broadcasting station and to compare it with said stored identification;

a reporting means to report a comparison result obtained through said comparison to said client; and wherein said client entrusts said broadcasting station to broadcast said returned contents and, by acquiring said comparison result, checks whether said contents entrusted by said client to be broadcast have been broadcast.

4. A broadcast verification system made up of a broadcasting station, a client entrusting said broadcasting station to broadcast contents including images, and a broadcast verification apparatus to verify whether said contents are broadcast as agreed to by a contract between said broadcasting station and said client, said broadcast verification apparatus comprising:

a storing means to store all or a part of said contents that said client entrusted sand broadcasting station to broadcast;

a comparing means to compare said contents detected from broadcasting waves broadcast by said broadcasting station with all or a part of said stored contents;

a reporting means to report a comparison result obtained through said comparison to said client; and wherein said client, by acquiring said comparison result, checks whether said contents entrusted by said client to be broadcast have been broadcast.

5. A broadcast verification apparatus for verifying, for a client which entrusts a broadcasting station to broadcast contents containing images, whether said contents have been broadcast as agreed to by a contract between said broadcasting station and said client, comprising:

a storing means to store feature descriptors of said contents;

a registering means to calculate said feature descriptors of said contents transmitted from said client and to register them on said storing means;

a detecting means to receive broadcasting waves broadcast by said broadcasting station and to detect said contents;

a feature descriptor calculating means to calculate feature descriptors of said detected contents;

a comparing means to compare said calculated feature descriptors with those stored in said storing means; and a reporting means to report said comparison result obtained through said comparison to said client.

6. The broadcast verification apparatus according to claim 5, wherein said feature descriptor calculating means generates said feature descriptor by dividing image data of said contents into a plurality of blocks, creating a reduced image using each of said blocks and performing frequency conversion and quantizing processing on said reduced image.

7. The broadcast verification apparatus according to claim 5, wherein said feature descriptor calculating means calculates said feature descriptors in all frames to be received.

8. The broadcast verification apparatus according to claim 5, said feature descriptor calculating means calculates said feature descriptors only in a part of said frames to be received.

9. The broadcast verification apparatus according to claim 5, further comprising:

a time information generating means to generate time information obtained when said comparing means detects said contents on which said client wants to perform said broadcast verification from said broadcasting waves;

a time information adding means to add said time information to said detected contents; and a storing means to store said contents with said time information added.

10. The broadcast verification apparatus according to claim 5, wherein said contents are made us of not only said images but also voices, said detecting means detects voice data making up said contents contained in said broadcasting waves, said storing means stores voice data making up said contents that said client entrusts said broadcasting station to broadcast and said comparing means compares said detected data with said stored voice data and outputs comparison results.

11. The broadcast verification apparatus according to claim 5, wherein said reporting means obtains said comparison results after having continued aggregation for a specified period of time and transmits said results to said client.

12. A broadcast verification apparatus for verifying, for a client which entrusts a broadcasting station to broadcast contents containing images, whether said contents have been broadcast as agreed to by a contract between said broadcasting station and said client, comprising:

a storing means to store an identification number assigned to each of said contents;

a registering means to assign said identification number to said contents on which said client wants to perform said broadcast verification and to issue said identification number to said client and to register it on said storing means;

a detecting means to receive broadcasting waves obtained when said contents with the issued identification number implanted, by using a digital watermarking technology making a digital watermarks, are broadcast by said broadcasting station and to detect said identification number implanted by said client, using said digital watermarking technology, from said broadcasting waves;

a comparing means to compare said detected identification number with said identification number stored in said storing means; and a reporting means to report said comparison result obtained through said comparison to said client.

13. The broadcast verification apparatus according to claim 12, further comprising:

a time information generating means to generate time information obtained when said comparing means detects said contents on which said client wants to perform said broadcast verification from said broadcasting waves;

a time information adding means to add said time information to said detected contents; and a storing means to store said contents with said time information added.

14. The broadcast verification apparatus according to claim 12, wherein said contents are made up of not only said images but also voices, said detecting means detects voice data making up said contents contained in said broadcasting waves, said storing means stores voice data making up said contents that said client entrusts said broadcasting station to broadcast and said comparing means compares said detected data with said stored voice data and outputs comparison results.

15. The broadcast verification apparatus according to claim 12, wherein said reporting means obtains said comparison results after having continued aggregation for a specified period of time and transmits said results to said client.

16. A broadcast verification apparatus for verifying, for a client which entrusts a broadcasting station to broadcast contents containing images, whether said contents have been broadcast as agreed to by a contract between said broadcasting station and said client, comprising;

a storing means to store an identification number assigned to each of said contents;

a registering means to assign said identification number to said contents on which said client wants to perform said broadcast verification and to register said identification number to said storing means;

an implanting means to implant said identification number in said contents on which said broadcast verification is to be performed by using digital watermarking technology making a digital watermark and to transmit them to said client;

a detecting means to receive broadcasting waves obtained when said contents with said identification implanted are broadcast by said broadcasting station and to detect said identification number implanted in said contents, using said digital watermarking technology, from said broadcasting waves;

a comparing means to compare said detected identification number with that stored in said storing means; and a reporting means to report said comparison result obtained through said comparison to said client.

17. The broadcast verification apparatus according to claim 16, further comprising:

a time information generating means to generate time information obtained when said comparing means detects said contents on which said client wants to perform said broadcast verification from said broadcasting waves;

a time information adding means to add said time information to said detected contents; and a storing means to store said contents with said time information added.

18. The broadcast verification apparatus according to claim 16, wherein said contents are made up of not only said images but also voices, said detecting means detects voice data making up said contents contained in said broadcasting waves, said storing means stores voice data making up said contents that said client entrusts said broadcasting station to broadcast and said comparing means compares said detected data with said stored voice data and outputs comparison results.

19. The broadcast verification apparatus according to claim 16, wherein said reporting means obtains said comparison results after having continued aggregation for a specified period of time and transmits said results to said client.

20. A broadcast verification apparatus for verifying, for a client which entrusts a broadcasting station to broadcast contents containing images, whether said contents have been broadcast as agreed to by a contract between said broadcasting station and said client, comprising;
   a storing means to store said contents;
   a registering means to register all or a part of said contents on which said client wants to perform said broadcast verification;
   a detecting means to receive broadcasting waves broadcast by said broadcasting station and to detect contents contained in said broadcasting waves;
   a comparing means to compare said detected contents with all or a part of said contents stored in said storing means; and
   a reporting means to report said comparison result obtained through said comparison to said client.

21. The broadcast verification apparatus according to claim 20, further comprising:
   a time information generating means to generate time information obtained when said comparing means detects said contents on which said client wants to perform said broadcast verification from said broadcasting waves;
   a time information adding means to add said time information to said detected contents; and
   a storing means to store said contents with said time information added.

22. The broadcast verification apparatus according to claim 20, wherein said contents are made up of not only said images but also voices, said detecting means detects voice data making up said contents contained in said broadcasting waves, said storing means stores voice data making up said contents that said client entrusts said broadcasting station to broadcast and said comparing means compares said detected data with said stored voice data and outputs comparison results.

23. The broadcast verification apparatus according to claim 20, wherein said reporting means obtains said comparison results after having continued aggregation for a specified period of time and transmits said results to said client.

24. A broadcast verification method for verifying, for a client which entrusts a broadcasting station to broadcast contents containing images, whether said contents have been broadcast as agreed to by a contract between said broadcasting station and said client, comprising;
   a step of receiving contents from said client;
   a step of calculating feature descriptors of said received contents;
   a step of storing said calculated feature descriptors;
   a step of receiving broadcasting waves broadcast by said broadcasting station and detecting said contents;
   a step of calculating feature descriptors of said detected contents;
   a step of comparing said calculated feature descriptors with said stored calculated feature descriptors; and
   a step of transmitting a result obtained by said comparison to said client.

25. A broadcast verification method for verifying, for a client which entrusts a broadcasting station to broadcast contents containing images, whether said contents have been broadcast as agreed to by a contract between said broadcasting station and said client, comprising;
   a step of assigning an identification number to each of said contents on which said client wants to perform said broadcast verification;
   a step of issuing said identification number to clients and storing identification numbers;
   a step of receiving broadcasting waves obtained when said broadcasting stations broadcast contents in which said identification number has been implanted by said client by using digital watermarking technology making a digital watermark and of detecting contents from said broadcasting waves;
   a step of judging whether said watermark exists in said detected contents;
   a step of detecting, if said watermark exists, said identification number implanted, using said digital watermarking technology, in said detected contents;
   a step of comparing said detected identification number with said stored identification number; and
   a step of transmitting a result obtained through said comparison to said client.

26. A broadcast verification method for verifying, for a client which entrusts a broadcasting station to broadcast contents containing images, whether said contents have been broadcast as agreed to by a contract between said broadcasting station and said client, comprising;
   a step of receiving contents on which said client wants to perform said broadcast verification;
   a step of assigning an identification number to each of said received contents and storing said identification number;
   a step of implanting said identification number in said contents on which said broadcast verification has to be performed, using digital watermarking technology making a digital watermark;
   a step of returning said contents with said identification number implanted to said client;
   a step of receiving broadcasting waves obtained when said broadcasting station broadcasts said contents with said identification number implanted and detecting said contents from said broadcasting station;
   a step of judging whether said watermark exists in said detected contents;
   a step of detecting, if said watermark exists, said identification number implanted, using said digital watermarking technology, in said detected contents;
   a step of comparing said detected identification number with said stored identification number; and
   a step of transmitting a result obtained through said comparison to said client.

27. A broadcast verification method for verifying, for a client which entrusts a broadcasting station to broadcast contents containing images, whether said contents have been broadcast as agreed to by a contract between said broadcasting station and said client, comprising;

a step of receiving contents from said client;

a step of storing all or a part of said received contents;

a step of receiving broadcasting waves broadcast by said broadcasting station and detecting contents;

a step of comparing said detected contents with all or a part of said stored contents; and a step of transmitting a result obtained through said comparison to said client.

28. A computer-readable storage medium storing a broadcast verification program for causing a computer to execute a broadcast verification method for verifying, for a client which entrusts a broadcasting station to broadcast contents containing images, whether said contents have been broadcast as agreed to by a contract between said broadcasting station and said client, said broadcast verification method comprising;

a step of receiving contents from said client;

a step of calculating feature descriptors of said received contents;

a step of storing said calculated feature descriptors;

a step of receiving broadcasting waves broadcast by said broadcasting station and detecting said contents;

a step of calculating feature descriptors of said detected contents;

a step of comparing said calculated feature descriptors with said stored calculated feature descriptors; and a step of transmitting a result obtained by said comparison to said client.

29. A computer-readable storage medium storing a broadcast verification program for causing a computer to execute a broadcast verification method for verifying, for a client which entrusts a broadcasting station to broadcast contents containing images, whether said contents have been broadcast as agreed to by a contract between said broadcasting station and said client, said broadcast verification method comprising:

a step of assigning an identification number to each of said contents on which said client wants to perform said broadcast verification;

a step of issuing said identification number to clients and storing identification numbers;

a step of receiving broadcasting waves obtained when said broadcasting stations broadcast contents in which said identification number has been implanted by said client by using digital watermarking technology making a digital watermark and of detecting contents from said broadcasting waves;

a step of judging whether said watermark exists in said detected contents;

a step of detecting, if said watermark exists, said identification number implanted, using said digital watermarking technology, in said detected contents;

a step of comparing said detected identification number with said stored identification number; and a step of transmitting a result obtained through said comparison to said client.

30. A computer-readable storage medium storing a broadcast verification program for causing a computer to execute a broadcast verification method for verifying, for a client which entrusts a broadcasting station to broadcast contents containing images, whether said contents have been broadcast as agreed to by a contract between said broadcasting station and said client, said broadcast verification method comprising;

a step of receiving contents on which said client wants to perform said broadcast verification;

a step of assigning an identification number to each of said received contents and storing said identification number;

a step of implanting said identification number in said contents on which said broadcast verification has to be performed, using digital watermarking technology making a digital watermark;

a step of returning said contents with said identification number implanted to said client;

a step of receiving broadcasting waves obtained when said broadcasting station broadcasts said contents with said identification number implanted and detecting said contents from said broadcasting station;

a step of judging whether said watermark exists in said detected contents;

a step of detecting, if said watermark exists, said identification number implanted, using said digital watermarking technology, in said detected contents;

a step of comparing said detected identification number with said stored identification number; and a step of transmitting a result obtained through said comparison to said client.

31. A computer-readable storage medium storing a broadcast verification program for causing a computer to execute a broadcast verification method for verifying, for a client which entrusts a broadcasting station to broadcast contents containing images, whether said contents have been broadcast as agreed to by a contract between said broadcasting station and said client, said broadcast verification method comprising;

a step of receiving contents from said client;

a step of storing all or a part of said received contents;

a step of receiving broadcasting waves broadcast by said broadcasting station and detecting contents;

a step of comparing said detected contents with all or a part of said stored contents; and a step of transmitting a result obtained through said comparison to said client.

32. A broadcast verification apparatus for verifying, for a client which entrusts a broadcasting station to broadcast contents containing images, whether said contents have been broadcast as agreed to by a contract between said broadcasting station and said client, comprising;

a storing section to store feature descriptors of said contents;

a registering section to calculate said feature descriptors of said contents transmitted from said client and to register them on said storing section;

a detecting section to receive broadcasting waves broadcast by said broadcasting station and to detect said contents;

a feature descriptor calculating section to calculate feature descriptors of said detected contents;

a comparing section to compare said calculated feature descriptors with those stored in said storing section; and a reporting section to report said comparison result obtained through said comparison to said client.

33. A broadcast verification apparatus for verifying, for a client which entrusts a broadcasting station to broadcast contents containing images, whether said contents have been broadcast as agreed to by a contract between said broadcasting station and said client, comprising;

a storing section to store an identification number assigned to each of said contents;

a registering section to assign said identification number to said contents on which said client wants to perform said broadcast verification and to issue said identification number to said client and to register it on said storing section;

a detecting section to receive broadcasting waves obtained when said contents with the issued identification number implanted, by using a digital watermarking technology making a digital watermark, are broadcast by said broadcasting station and to detect said identification number implanted by said client, using said digital watermarking technology, from said broadcasting waves;

a comparing section to compare said detected identification number with said identification number stored in said storing section; and a reporting section to report said comparison result obtained through said comparison to said client.

34. A broadcast verification apparatus for verifying, for a client which entrusts a broadcasting station to broadcast contents containing images, whether said contents have been broadcast as agreed to by a contract between said broadcasting station and said client, comprising;

a storing section to store said contents;

a registering section to register all or a part of said contents on which said client wants to perform said broadcast verification;

a detecting section to receive broadcasting waves broadcast by said broadcasting station and to detect contents contained in said broadcasting waves;

a comparing section to compare said detected contents with all or a part of said contents stored in said storing section; and a reporting section to report said comparison result obtained through said comparison to said client.

* * * * *